United States Patent
Sayari et al.

(10) Patent No.: US 8,361,200 B2
(45) Date of Patent: Jan. 29, 2013

(54) MATERIALS, METHODS AND SYSTEMS FOR SELECTIVE CAPTURE OF $CO_2$ AT HIGH PRESSURE

(75) Inventors: Abdelhamid Sayari, Ottawa (CA); Youssef Belmabkhout, Gatineau (CA)

(73) Assignee: Abdelhamid Sayari, Ottawa (CA)

( * ) Notice: Subject to any disclaimer, the term of this patent is extended or adjusted under 35 U.S.C. 154(b) by 442 days.

(21) Appl. No.: 12/579,936

(22) Filed: Oct. 15, 2009

(65) Prior Publication Data

US 2011/0088549 A1    Apr. 21, 2011

(51) Int. Cl.
*B01D 53/02* (2006.01)

(52) U.S. Cl. .......................... 95/139; 95/900

(58) Field of Classification Search .............. 95/96, 139, 95/900, 902; 423/230
See application file for complete search history.

(56) References Cited

U.S. PATENT DOCUMENTS

| | | | |
|---|---|---|---|
| 3,751,878 A * | 8/1973 | Collins | 95/105 |
| 6,346,140 B2 * | 2/2002 | Miyazawa et al. | 95/139 |
| 6,565,627 B1 * | 5/2003 | Golden et al. | 95/96 |
| 7,538,068 B2 * | 5/2009 | Kato et al. | 502/407 |
| 7,618,606 B2 * | 11/2009 | Fan et al. | 423/230 |
| 7,767,004 B2 * | 8/2010 | Sayari et al. | 95/285 |
| 7,947,120 B2 * | 5/2011 | Deckman et al. | 95/139 |
| 2004/0045434 A1 * | 3/2004 | Golden et al. | 95/96 |
| 2007/0149398 A1 * | 6/2007 | Jones et al. | 502/402 |

FOREIGN PATENT DOCUMENTS

| | | |
|---|---|---|
| WO | WO 2004/054708 A2 * | 7/2004 |
| WO | 2008081102 A2 | 7/2008 |

OTHER PUBLICATIONS

Beck et al.: "A New Family of Mesoporous Molecular Sieves Prepared with Liquid Crystal Templates", 1992, Journal of American Chemical Society, vol. 114, No. 27, pp. 10834-10843.
Huo et al.: "Mesostructure Design with Gemini Surfactants: Supercage Formation in a Three-Dimensional Hexagonal Array", Jun. 2, 1995, Science, New Series, vol. 268, No. 5215, pp. 1324-1327.
Yanagisawa et al.: "The Preparation of Alkyltrimethylammonium-Kanemite Complexes and their Conversion to Microporous Materials", Apr. 1990, Bulletin of the Chemical Society of Japan, vol. 63, No. 4, pp. 988-992.
Huo et al.: "Surfactant Control of Phases in the Synthesis of Mesoporous Silica-Based Materials", 1996, Chemistry of Materials, vol. 8, pp. 1147-1160, doi: S0897-4756(96)00137-8.
Sakamoto et al.: "Direct Imaging of the Pores and Cages of Three-Dimensional Mesoporous Materials", Nov. 23, 2000, Nature, vol. 408, pp. 449-453.
Zhao et al.: "Novel Mesoporous Silicates with Two-Dimensional Mesostructure Direction Using Rigid Bolaform Surfactants", 1999, Chemistry of Materials, vol. 11, No. 10, pp. 2668-2672, doi: 10.1021/cm980755t.
Zhao et al.: "Nonionic Triblock and Star Diblock Copolymer and Oligomeric Surfactant Syntheses of Highly Ordered, Hydrothermally Stable, Mesoporous Silica Structures", 1998, Journal of American Chemical Society, vol. 120, No. 24, pp. 6024-6036, doi: S0002-7863(97)04025-0.
Zhao et al.: "Triblock Copolymer syntheses of Mesoporous Silica with Periodic 50 to 300 Angstrom Pores", Jan. 23, 1998, Science, New Series, vol. 279, No. 5350, pp. 548-552.

(Continued)

*Primary Examiner* — Frank Lawrence, Jr.
(74) *Attorney, Agent, or Firm* — Osler, Hoskin & Harcourt LLP

(57) ABSTRACT

The present invention provides methods and systems for carbon dioxide, hydrogen sulfide and other acid gases capture via adsorption at high pressure using mesoporous materials.

20 Claims, 16 Drawing Sheets

OTHER PUBLICATIONS

Kleitz et al.: "Cubic Ia3d Large Mesoporous Silica: Synthesis and Replication to Platinum Nanowires, Carbon Nanorods and Carbon Nanotubes", 2003, Chemical Communications, vol. 17, pp. 2136-2137, doi: 10.1039/b306504a.

Han et al.: "High-Temperature Generalized Synthesis of Stable Ordered Mesoporous Silica-Based Materials by Using Fluorocarbon-Hydrocarbon Surfactant Mixtures", 2003, Angewandte Chemical International Edition, vol. 42, pp. 3633-3637, doi: 10.1002/anie.200351466.

Newalkar et al.: "Synthesis and Characterization of PSU-1, a Novel Cage-Like Mesoporous Silica", 2003, Journal Materials Chemistry, vol. 13, pp. 1710-1716, doi: 10.1039/b303406b.

Schmidt-Winkel et al.: "Mesocellular Siliceous Foams with Uniformly Sized Cells and Windows", 1999, Journal of American Chemical Society, vol. 121, No. 1, pp. 254-255, doi: 10.1021/ja983218i.

Kleitz et al.: "Large Cage Face-Centered-Cubic Fm3m Mesoporous Silica: Synthesis and Structure", 2003, The Journal of Physical Chemistry B, vol. 107, No. 51, pp. 14296-14300, doi: 10.1021/jp036136b.

Fan et al.: "Cubic Mesoporous Silica with Large Controllable Entrance Sizes and Advanced Adsorption Properties", 2003, Angewandte Chemical International Edition, vol. 42, pp. 3146-3150, doi: 10.1002/anie.200351027.

Yu et al. "Highly Ordered Large Caged Cubic Mesoporous Silica Structures Templated by Triblock PEO-PBO-PEO Copolymer", 2000, Chemical Communication, vol. 7, pp. 575-576, doi: 10.1039/b000603n.

Shen et al.: "A Novel Ordered Cubic Mesoporous Silica Templated with Tri-Head Group Quaternary Ammonium Surfactant", 2002, Chemical Communication, vol. 19, pp. 2212-2213, doi: 10.1039/b206993h.

Liu et al.: "Room-Temperature Synthesis in Acidic Media of Large-Pore Three-Dimensional Bicontinuous Mesoporous Silica with Ia3d Symmetry", 2002, Angewandte Chemical International Edition, vol. 41, No. 20, pp. 3876-3878.

Che et al.: "A Novel Anionic Surfactant Templating Route for Synthesizing Mesoporous Silica with Unique Structure", 2003, Nature Materials, vol. 2, pp. 801-805, doi: 10.1038/nmat1022.

Garcia-Bennett et al.: "Structural Investigations of AMS-n Mesoporous Materials by Transmission Electron Microscopy", 2004, Chemistry of Materials, vol. 16, No. 5, pp. 813-821, doi: 10.1021/cm035074z.

Bagshaw et al.: "Templating of Mesoporous Molecular Sieves by Nonionic Polyethylene Oxide Surfactants", Sep. 1, 1995, Science, New Series, vol. 269, No. 5228, pp. 1242-1244.

Prouzet et al.: "Assembly of Mesoporous Silica Molecular Sieves Based on Nonionic Ethoxylated Sorbitan Esters as Structure Directors", 1999, Chemistry of Materials, vol. 11, No. 6, pp. 1498-1503, doi: 10.1021/cm9810281.

Tanev et al.: "Assembly of Mesoporous Lamellar Silicas with Hierarchical Particle Architectures", 1997, Journal of American Chemical Society, vol. 119, No. 37, pp. 8616-8624.

Kim et al.: "Ultrastable Mesostructured Silica Vesicles", Nov. 13, 1998, Sicience, vol. 282, pp. 1302-1305, doi: 10.1126/science.282.5392.1302.

Tanev et al.: "A Neutral Templating Route to Mesoporous Molecular Sieves", Feb. 10, 1995, Science, New Series, vol. 267, No. 5199, pp. 865-867.

Deng et al.: "Ordered Mesoporous Silicas and Carbons with Large Accesible Pores Templated from Amphiphilic Diblock Copolymer Poly(ethylene oxide) -b-Polystyrene", 2007, Journal of American Chemical Society, vol. 129, pp. 1690-1697, doi: 10.1021/ja067379v.

Di et al.: "Ordering Improvement of Mesoporous Silica Materials Templated from Semi-Fluorinated Nonionic Surfactants by Introduction of Organic Additives", 2005, Microporous and Mesoporous Materials, vol. 82, pp. 121-127, doi: 10.1016/j.micromeso.2005.03.008.

Li et al.: "High-Temperature Synthesis of Stable Ordered Mesoporous Silica Materials by Using Fluorocarbon-Hydrocarbon Surfactant Mixtures", 2004, Chemistry—A European Journal, vol. 10, No. 23, pp. 5911-5922, doi: 10.1002/chem.200400188.

Yang et al.: "Stable Ordered Mesoporous Silica Materials Templated by High-Temperature Stable Surfactant Micelle in Alkaline Media", 2004, Journal of Physical Chemistry B, vol. 108, No. 15, pp. 4696-4700, doi: 10.1021/jp0380226.

Meng et al.: "Semi-Fluorinated Surfactant Syntheses of Ordered Porous Materials with Tailorable Pore Sizes", 2004, Chemistry of Materials, vol. 16, No. 25, pp. 5518-5526, doi: 10.1021/cm0497475.

Yokoi et al.: "Synthesis of Mesoporous Silica Materials by Using Anionic Sucfactants as Template", 2007, Journal of the Japan Petroleum Institute, vol. 50, No. 6, pp. 299-311.

Babarao et al.: "Storage and Separation of $CO_2$ and $CH_4$ in Silicalite, C168 Schwarzite, and IRMOF-1: A Comparative Study from Monte Carlo Simulation", 2007, Langmuir, vol. 23, No. 2, pp. 659-666, doi: 10.1021/la062289p.

Bahr et al.: "Mechanical Properties of cubic Zinc Carboxylate IRMOF-1 Metal-Organic Framework Crystals", 2007, The American Physical Society, Physical Review B, vol. 76, No. 18, 184106, doi: 10.1103/PhysRevB.76.184106.

Bastin et al.: "A Microporous Metal-Organic Framework for Separation of $CO_2/N_2$ and $CO_2/CH_4$ by Fixed-Bed Adsorption", 2008, Journal of Physical Chemistry C, vol. 112, No. 5, pp. 1575-1581, doi: 10.1021/jp077618g.

Belmabkhout et al.: "High-Pressure Adsorption Measurements. A Comparative Study of the Volumetric and gravimetric Methods", 2004, Measurement Science and Technology, vol. 15, No. 5, pp. 848-858, doi: 10.1088/0957-0233/15/5/010.

Bernal et al.: "Separation of $CO_2/N_2$ Mixtures Using MFI-Type Zeolite Membranes", 2004, American Institute of Chemical Engineers Journal, vol. 50, No. 1, pp. 127-135.

Cassiers et al.: "A Detailed Study of Thermal, Hydrothermal, and Mechanical Stabilities of a Wide Range of Surfactant Assembled Mesoporous Silicas", 2002, Chemistry of Materials, vol. 14, No. 5, pp. 2317-2324, doi: 10.1021/cm0112892.

Cracknell et al.: "Adsorption and Selectivity of Carbon Dioxide with Methane and Nitrogen in Slit-Shaped Carbonaceous Micropores: Simulation and Experiment" 1996, Adsorption 2, Kluwer Academic Publishers, pp. 193-203.

Do et al.: "A New Model for the Description of Adsorption Kinetics in Heterogeneous Activated Carbon", 1998, Carbon, vol. 36, No. 10, pp. 1539-1554, doi:10.1016/S0008-6223(98)00145-6.

Dreisbach et al.: "Adsorption Equilibria of $CO/H_2$ with a Magnetic Suspension Balance", 2003, Journal of Thermal Analysis and Calorimetry, vol. 71, pp. 73-82.

Dreisbach et al.: "Experimental Investigation of the Kinetics of Adsorption of Pure Gases and Binary Gas Mixtures on Activated Carbon", May 1998, Elsevier, pp. 1219-1224.

Huang et al.: "Simulations of Binary Mixture Adsorption of Carbon Dioxide and Methane in Carbon Nanotubes: Temperature, Pressure, and Pore Size Effects", 2007, Journal of Physical Chemistry C, vol. 111, No. 32, pp. 11912-11920, doi:10.1021/jp067226u.

Li et al.: "Gas Adsorption and Storage in Metal-Organic Framework MOF-177", 2007, Langmuir, vol. 23, No. 26, pp. 12937-12944, doi: 10.1021/la702466d.

Llewellyn et al.: "How Hydration Drastically Improves Adsorption Selectivity for $CO_2$ Over $CH_4$ in the Flexible Chromium Terephthalate MIL-53", Nov. 27, 2006, Angewandte Chemical International Edition, vol. 45, No. 46, pp. 7751-7754, doi: 10.1002/anie.200602278.

Berenguer-Murcia et al.: "Probe Molecule Kinetic Studies of Adsorption on MCM-41", 2003, Journal of Physical Chemistry B, vol. 107, No. 4, pp. 1012-1020, doi: 10.1021/jp026764d.

Serna-Guerrero et al.: "Applications of Pore-Expanded Mesoporous Silica. 7. Adsorption of Volatile Organic Compounds", 2007, Environmental Science & Technology, vol. 41, No. 13, pp. 4761-4766, doi: 10.1021/es0627996.

Sircar, S.: "Role of Helium Void Measurement in Estimation of Gibbsian Surface Excess", Air Products and Chemicals, Inc., pp. 656-663.

Siriwardane et al.: "Adsorption of $CO_2$ on Molecular Sieves and Activated Carbon", 2001, Energy and Fuels, vol. 15, No. 2, pp. 279-284, doi: 10.1021/ef000241s.

Veawab et al.: "Corrosion Behavior of Carbon Steel in the CO2 Absorption Process Using Aqueous Amine Solutions", 1999, Industrial & Engineering Chemistry Research, vol. 38, No. 10, pp. 3917-3924, doi: 10.1021/ie9901630.

Yang et al.: "Molecular Simulation of Carbon Dioxide/Methane/Hydrogen Mixture Adsorption in Metal-Organic Frameworks", 2006, Journal of Physical Chemistry B, vol. 110, No. 36, pp. 17776-17783, doi: 10.1021/jp062723w.

Yun et al.: "Adsorption of Methane, Ethane, and their Binary Mixtures on MCM-41: Experimental Evaluation of Methods for the Prediction of Adsorption Equilibrium", 2002, Langmuir, vol. 18, No. 7, pp. 2693-2701, doi: 10.1021/la0155855.

Belmabkhout et al.: "A Complete Experimental Approach for Synthesis Gas Separation Studies Using Static Gravimetric and Column Breakthrough Experiments", 2007, Adsorption, vol. 13, pp. 341-349, doi: 10.1007/s10450-007-9032-6.

Bourrelly et al.: "Different Adsorption Behaviors of Methane and Carbon Dioxide in the Isotypic Nanoporous Metal Terephthalates MIL-53 and MIL-47", 2005, Journal of American Chemical Society, vol. 127, No. 39, pp. 13519-13521, doi: 10.1021/ja054668v.

Branton et al.: "Adsorption of Carbon Dioxide, Sulfur Dioxide and Water Vapour by MCM-41, a Model Mesoporous Adsorbent", 1991, Journal of the Chemical Society, Faraday Transactions, vol. 91, No. 13, pp. 2041-2043, doi: 10.1039/FT9959102041.

Cavenati et al.: "Adsorption Equilibrium of Methane, Carbon Dioxide, and Nitrogen on Zeolite 13X at High Pressures", 2004, Journal of Chemical Engineering & Data, vol. 49, No. 4, pp. 1095-1101, doi: 10.1021/je0498917.

Comotti et al.: "2D Multinuclear NMR, Hyperpolarized Xenon and Gas Storage in Organosilica Nanochannels with Crystalline Order in the Walls", 2007, Journal of American Chemical Society, vol. 129, No. 27, pp. 8566-8576, doi: 10.1021/ja071348y.

Goj et al.: "Atomistic Simulations of CO2 and N2 Adsorption in Silica Zeolites: The Impact of Pore Size and Shape", 2002, Journal of Physical Chemistry B, vol. 106, No. 33, pp. 8367-8375, doi: 10.1021/jp025895b.

Harlick et al.: "Applications of Pore-Expanded Mesoporous Silica. 5. Triamine Grafted Material with Exceptional CO2 Dynamic and Equilibrium Adsorption Performance", 2007, Industrial & Engineering Chemistry Research, vol. 46, No. 2, pp. 446-458, doi: 10.1021/ie060774+.

He et al.: "Heats of Adsorption and Adsorption Heterogeneity for Methane, Ethane, and Carbon Dioxide in MCM-41", 2006, Langmuir, vol. 22, No. 3 pp. 1150-1155, doi: 10.1021/la052237k.

Himeno et al.: "High-Pressure Adsorption Equilibria of Methane and Carbon Dioxide on Several Activated Carbons", 2005, Journal of Chemical Engineering & Data, vol. 50, No. 2, pp. 369-376, doi: 10.1021/je049786x.

Hong et al.: "Hydrogen Purification Using a SAPO-34 Membrane", 2008, Journal of Membrane Science, vol. 307, pp. 277-283, doi:10.1016/j.memsci.2007.09.031.

Millward et al.: "Metal-Organic Frameworks with Exceptionally High Capacity for Storage of Carbon Dioxide at Room Temperature", 2005, Journal of American Chemical Society, vol. 127, No. 51, pp. 17998-17999, doi: 10.1021/ja0570032.

Morishige et al.: "Capillary Critical Point of Argon, Nitrogen, Oxygen, Ethylene, and Carbon Dioxide in MCM-41", 1997, Langmuir, vol. 13, No. 13, pp. 3494-3498, doi: 10.1021/la970079u.

Morishige et al.: "Nature of Adsorption and Desorption Branches in Cylindrical Pores", 2004, Langmuir, vol. 20, No. 11, pp. 4503-4506, doi: 10.1021/la030414g.

Satyapal et al.: "Performance and Properties of a Solid Amine Sorbent for Carbon Dioxide Removal in Space Life Support Applications", 2001, Energy & Fuels, vol. 15, No. 2, pp. 250-255, doi: 10.1021/ef0002391.

Sayari, A.: "Catalysis by Crystalline Mesoporous Molecular Sieves", 1996, Chemical Material, vol. 8, No. 8, pp. 1840-1852, doi: 10.1021/cm950585+.

Sonwane et al.: "Experimental and Theoretical Investigations of Adsorption Hysteresis and Criticality in MCM-41: Studies with O2, Ar, and CO2", 1998, Industrial & Engineering Chemistry Research, vol. 37, No. 6, pp. 2271-2283, doi: 10.1021/ie970883b.

Sridhar et al.: "Separation of Carbon Dioxide from Natural Gas Mixtures Through Polymeric Membranes—A Review", 2007, Separation & Purification Reviews, vol. 36, No. 2, pp, 113-174, doi: 10.1080/15422110601165967.

Wang et al.: "High-Temperature Adsorption of Carbon Dioxide on Mixed Oxides Derived from Hydrotalcite-Like Compounds", 2008, Environmental Science & Technology, vol. 42, No. 2, pp. 614-618, doi: 10.1021/es072085a.

Yang et al.: "Molecular Simulation of Separation of CO2 from Flue Gases in Cu-BTC Metal-Organic Framework", Nov. 2007, American Institute of Chemical Engineers Journal, vol. 53, No. 11, pp. 2832-2840, doi: 10.1002/aic.11298.

Yang et al.: "Computational Study of CO2 Storage in Metal-Organic Frameworks", 2008, Journal of Physical Chemistry C, vol. 112, No. 5, pp. 1562-1569, doi: 10.1021/jp077387d.

Akten et al.: "Monte Carlo Simulation of Single- and Binary-Component Adsorption of CO2, N2, and H2 in Zeolite Na-4A", 2003, Energy & Fuels, vol. 17, No. 4, pp. 977-983, doi: 10.1021/ef0300038.

Cavenati et al.: "Separation of CH4/CO2/N2 Mixtures by Layered Pressure Swing Adsorption for Upgrade of Natural Gas", 2006, Chemical Engineering Science, vol. 61, pp. 3893-3906, doi: 10.1016/j.ces.2006.01.023.

Zhou et al.: "Synthesis of Ordered Cubic Periodic Mesoporous Organosilicas with Ultra-Large Pores", 2007, Chemical Material, vol. 19, No. 7, pp. 1870-1876, doi: 10.1021/cm062989f.

Serna-Guerrero, Rodrigo et al., "New Insights into the Interactions of CO2 with Amine-Functionalized Silica", Ind. Eng. Chem. Res. 2008, 47, 9406-9412.

* cited by examiner

Gas streams:

Flue gas (1-2 bar)
Biogas (1-7 bar)
Syngas (20 bar)

MATERIALS, METHODS AND SYSTEMS FOR SELECTIVE CAPTURE OF $CO_2$ AT HIGH PRESSURE

FIELD OF THE INVENTION

The present invention pertains to the field of adsorption methods and systems for selective capture of carbon dioxide and other acid gases, more particularly, to the field of adsorption methods and systems that employ mesoporous silica for the separation of carbon dioxide and other acid gases at high pressure.

BACKGROUND

Carbon dioxide ($CO_2$) is a major greenhouse gas with significant contribution to global warming (Halmann and Stenberg 1999). Removal of $CO_2$ from different gas streams is becoming increasingly important for various applications like treatment of flue gas, natural gas, biogas, and hydrogen purification as well as closed-circuit breathing systems (CCBS) for use in confined spaces such as manned space shuttles (Satyapal et al. 2001), and in emergency situations. The recovered $CO_2$, with different degrees of purity, also has numerous applications in the chemical industry.

Separation, capture and storage of carbon dioxide ($CO_2$) have received significant attention in recent years. Liquid phase absorption in amine solutions has been widely used to treat gases with medium to high $CO_2$ concentration, but due to the high regeneration cost of the absorbent and corrosion problems (Veawab et al. 1999), it is highly desirable to develop less energy intensive technologies like adsorption (Ruthven 1994) and membrane separation (Hong et al. 2008).

Many of $CO_2$ adsorbents have been developed in recent years including metal oxides (Wang et al. 2008), zeolites (Goj et al. 2002; Cavenati et al. 2006; Akten et al. 2003; Belmabkhout et al. 2007), carbon (Himeno et al. 2005), metal-organic frameworks (MOFs) (Millward and Yaghi 2005; Bourrelly et al. 2005; Yang et al. 2008; Yang and Zhong 2006; Li and Yang 2007), organo-silicas and surface-modified silicas (Harlick and Sayari 2007; Comoti et al. 2007) as well as membrane technology (Sridhar et al. 2007; Hong et al. 2008).

Ideally, an adsorption medium for $CO_2$ removal at ambient temperature should combine (i) high $CO_2$ uptake, (ii) complete regeneration under mild condition, (iii) high thermal stability, and (iv) favourable adsorption-desorption kinetics.

The discovery of periodic mesoporous materials like MCM-41 silica has resulted in extensive research activity on their synthesis and applications, particularly for separation and catalysis (Sayari 1996; Sayari and Jaroniec 2008). It is intriguing that despite the significant growth in the area of periodic mesoporous materials (for a review see Sayari (2003) and references therein), there are only few studies devoted to $CO_2$ adsorption on materials like MCM-41 silica (Branton et al. 1995; Morishige et al. 1997; Morishige and Nakamura 2004; Sonwane et al. 1998). The early studies by Morishige et al. (1997, 2004) and Sonwane et al. (1998) focused on high pressure $CO_2$ adsorption at temperature below 273 K for the purpose of structural characterization. He and Seaton (2006) studied low pressure adsorption of pure $CO_2$ and $CO_2$—$CH_4$ mixture for the characterization of MCM-41 surface heterogeneity. Although, the use of organically-modified silica materials for $CO_2$ removal was extensively studied using different mesoporous silica supports such as MCM-41, SBA-15, MCM-48 and pore-expanded MCM-41 (for a review see Harlick and Sayari (2007) and reference therein); adsorption of $CO_2$ was investigated in a limited range of $CO_2$ concentration, temperature and pressure. The patent application WO 2008/081102 (Pirngruber et al. 2008) discloses the use of metal-organic frameworks (MOFs) having a pore diameter in the range of 0.5-5 nm and surface area the range of 2000-4000 $m^2/g$, for hydrogen purification and carbon dioxide recovery at pressure higher than 4 bar.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide methods and systems for selective $CO_2$, $H_2S$, $SO_2$ and other acid gases adsorption using mesoporous silica. In accordance with one aspect of the present invention, there is provided a process for the removing $CO_2$ from a gas stream containing $CO_2$, which process comprises conducting said gas stream through an adsorbent containing a mesoporous material under high pressure to adsorb said $CO_2$ onto said adsorbent and produce a substantially $CO_2$-free gas stream (Stage 1). Advantageously, the process additionally comprises the step of reducing the pressure on said adsorbent having $CO_2$ adsorbed thereon to a moderate pressure to desorb at least a fraction of the adsorbed $CO_2$ (Stage 2). When the two Stages 1 and 2 take place at the same temperature, the process is a pressure swing adsorption referred to as PSA-H/M where H in bar is the adsorption pressure (Stage 1) and M in bar is the desorption pressure (Stage 2).

In accordance with another aspect of the present invention, there is provided a method for selectively removing or recovering $CO_2$, as well as $H_2S$, $SO_2$ and other acid gases from a gaseous stream or atmosphere containing $CO_2$, $H_2S$, $SO_2$ and other acid gases, comprising the step of contacting the gaseous stream or atmosphere with an adsorbent comprising ordered or disordered mesoporous silica having a pore volume of between 0.4 and 4 $cm^3/g$, a median pore diameter of between 2 and 50 nm and a BET surface area of between 500 and 2000 $m^2/g$.

In accordance with another aspect of the invention, there is provided a system for selectively removing or recovering $CO_2$, $H_2S$, $SO_2$ and other acid gases from an gaseous stream or atmosphere containing said $CO_2$, $H_2S$, $SO_2$ and other acid gases using a system comprising: (a) a sorbent bed comprising a mesoporous silica; (b) means for contacting the gaseous stream or atmosphere with the sorbent bed; and (c) means of removing the $CO_2$, $H_2S$, $SO_2$ and other acid gases from the sorbent bed.

In accordance with another aspect of the present invention there is provided a mesoporous silica adsorbent having a high gravimetric and volumetric $CO_2$ adsorption capacity, high efficiency for selective $CO_2$ adsorption, fast $CO_2$ kinetics with a low energy requirement for regeneration.

In one example, the gravimetric and volumetric $CO_2$ adsorption capacities for mesoporous MCM-41-100 silica was 64.7 wt % (14.7 mmol/g) and 234.2 $cm^3/cm^3$ at 45 bar and room temperature.

In another example, the $CO_2$ selectivity vs. $N_2$ in $CO_2$:$N_2$=20:80 mixture over MCM-41-100 was 15 at 45 bar and room temperature.

In another example, the $CO_2$ selectivity vs. $O_2$ in $CO_2$:$O_2$=95:5 mixture over MCM-41-100 was 22 at 45 bar and room temperature.

In another example, the $CO_2$ selectivity vs. $CH_4$ in $CO_2$:$CH_4$=50:50 mixture over MCM-41-100 was 7 at 45 bar and room temperature.

In another example, the $CO_2$ selectivity vs. $H_2$ in $CO_2$:$H_2$=20:80 mixture over MCM-41-100 was 63 at 45 bar and room temperature.

In accordance with another aspect of the present invention there is provided a PSA-H/M process using mesoporous silica for bulk $CO_2$ separation process with the dual purpose of separation at high pressure (e.g., H=45 bar) and recovery of $CO_2$ at moderate pressure (M=10 bar for example) from gas streams.

In one example, the $CO_2$ PSA-45/10 operating capacity in $CO_2$:$N_2$=20:80 mixture over MCM-41-100 was 11.13 wt % (2.58 mmol/g).

In another example, the $CO_2$ PSA-45/10 operating capacity in $CO_2$:$CH_4$=50:50 mixture over MCM-41-100 was 23.7 wt % (5.40 mmol/g).

In another example, the $CO_2$ PSA-45/10 operating capacity in $CO_2$:$H_2$=20:80 mixture over MCM-41-100 was 13.3 wt % (3.1 mmol/g).

In accordance with another aspect of the present invention there is provided a mesoporous silica adsorbent having a high capacity of $CO_2$ at high pressure with and without the presence of water vapour.

In another example, the gravimetric $CO_2$ adsorption capacity for mesoporous PE-MCM-41 silica in dry and humid (40% relative humidity, RH) conditions was 100 wt % (22.8 mmol/g) and 102 wt % (23.2) at 60 bar and room temperature.

In accordance with another aspect of the present invention there is provided a hydrated mesoporous silica adsorbent having an enhanced selectivity toward $CO_2$ vs. supercritcal gases such as $N_2$, $CH_4$, $O_2$ and $H_2$.

DETAILED DESCRIPTION OF THE INVENTION

Figure 1:
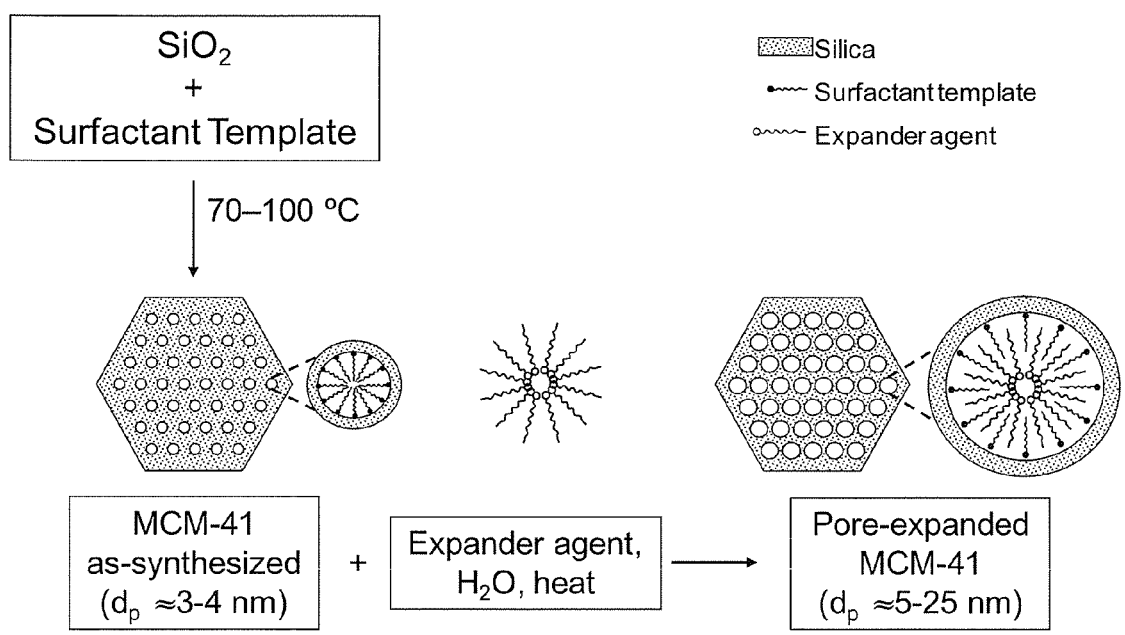
FIG. 1 schematically depicts the synthesis of MCM-41 mesoporous silica and post-synthesis pore expansion to PE-MCM-41.

Unless defined otherwise, all technical and scientific terms used herein have the same meaning as commonly understood by one of ordinary skill in the art to which this invention belongs.

The present invention provides methods and systems for $CO_2$ adsorption that take advantage of the selective $CO_2$ adsorption capabilities of mesoporous silica, particularly when adsorption is performed under high pressure. In one preferred embodiment, the system and process or method of the invention includes the use of mesoporous silica as a sorbent.

Mesoporous Silica

Mesoporous silicas exhibit ordered or disordered pore systems. These mesoporous silicas include those prepared in the presence of surfactants or polymer solutions via different pathways including the so-called cooperative organization mechanism and the liquid crystal templating mechanism (For review see Sayari 2003). Typically, the surfactants or polymers are removed by calcination of mesoporous silica precursor at high temperature. Other procedures for surfactant or polymer removal such as solvent extraction or microwave treatment may also be applied. Mesoporous silicas may exhibit different structures and pore systems, the most prominent being the so-called MCM-41 with a two-dimensional hexagonal symmetry. Table 1 provides a non-exhaustive list of mesoporous silicas, prepared under different pH conditions using different amphiphile molecules, that can be used in the present invention. The pore size of such material may be adjusted from a low of 1 nm to well into the macropore regime, i.e. >50 nm.

TABLE 1

| Mesoporous Silicas and Organosilicas | | | | |
|---|---|---|---|---|
| Mesophase | Amphiphile template | pH | Structure | Ref. |
| MCM-41 | $C_nH_{2n+1}(CH_3)_3N^+$ | basic | 2D hexagonal (p6mm) | [1] |
| MCM-48 | $C_nH_{2n+1}(CH_3)_3N^+$ | basic | cubic (Ia$\bar{3}$d) | [1] |
|  | Gemini $C_{n-s-n}{}^a$ |  |  | [2] |
| FSM-16 | $C_{16}H_{31}(CH_3)_3N^+$ | basic | 2D hexagonal (p6mm) | [3] |

TABLE 1-continued

Mesoporous Silicas and Organosilicas

| Mesophase | Amphiphile template | pH | Structure | Ref. |
|---|---|---|---|---|
| SBA-1 | $C_{18}H_{37}N(C_2H_5)_3^+$ | acidic | cubic (Pm$\bar{3}$n) | [2] |
| SBA-2 | Divalent $C_{n-s-1}$[b] | acidic/basic | 3D hexagonal (P6$_3$/mmc) | [2] |
| SBA-3 | $C_nH_{2n+1}N(CH_3)_3^+$ | acidic | 2D hexagonal (p6mm) | [4] |
| SBA-6 | Divalent $18B_{4-3-1}$[c] | basic | cubic (Pm$\bar{3}$n) | [5] |
| SBA-8 | Bolaform[d] | basic | 2D rectangular (cmm) | [6] |
| SBA-11 | Brij ® 56; $C_{16}EO_{10}$ | acidic | cubic (Pm$\bar{3}$n) | [7] |
| SBA-12 | Brij ® 76; $C_{18}EO_{10}$ | acidic | 3D hexagonal (P6$_3$/mmc) | [7] |
| SBA-14 | Brij ® 30; $C_{12}EO_4$ | acidic | cubic | [7] |
| SBA-15 | P123; $EO_{20}PO_{70}EO_{20}$ | acidic | 2D hexagonal (p6mm) | [8] |
| KIT-6 | P123 + Butanol | acidic | cubic (Ia$\bar{3}$d) | [9] |
| JLU-11 | $CF_3(CF_2)_5(EO)_{14}$ | acidic | disordered | [27] |
| JLU-12 | $CF_3(CF_2)_5(EO)_{14}$ | neutral | disordered | [27] |
| JLU-14 | $CF_3(CF_2)_4(EO)_{10}$ | acidic | 2D hexagonal (p6mm) | [30] |
| JLU-15 | $CF_3(CF_2)_4(EO)_{10}$ | neutral | 2D hexagonal (p6mm) | [30] |
| JLU-20 | P123 + FC-4[e] | acidic | 2D hexagonal (p6mm) | [10] |
| JLU-21 | FC-4 and F127 | acidic | cubic Im3m | [28] |
| JLU-30 | (>160°) DIHAB[j] | basic | 2D hexagonal (p6mm) | [29] |
| PSU-1 | P123 + CTACl | acidic | 2D hexagonal (p6mm) | [11] |
| Mesocellular | P123 + TMB[f] | acidic | disordered | [12] |
| SBA-16 | F127; $EO_{106}PO_{70}EO_{106}$ | acidic | cubic (Im$\bar{3}$m) | [7] |
| KIT-5 | F127 | acidic | cubic (Fm$\bar{3}$m) | [13] |
| FDU-12 | F127 + additives[g] | acidic | cubic (Fm$\bar{3}$m) | [14] |
| FDU-1 | B50-6600; $EO_{39}BO_{47}EO_{39}$ | acidic | cubic (Im$\bar{3}$m) | [15] |
| FDU-2 | $RN^+N^+N^{+}$[h] | basic | cubic (Fd3m) | [16] |
| FDU-5 | P123 + additives[i] | acidic | cubic (Ia$\bar{3}$d) | [17] |
| FDU-18 | PEO-b-PS | acidic | cubic (Fm$\bar{3}$m) | [26] |
| FDU-12 | F127 + TMB | acidic | cubic (Fm$\bar{3}$m) | [25] |
| AMS-n | Anionic surfactant | basic | AMS-1: 3D hexagonal<br>AMS-2: 2D cubic<br>AMS-3: 2D hexagonal<br>AMS-4: 3D cubic<br>AMS-6: 3D cubic<br>AMS-7: 3D disordered<br>AMS-8: 3D cubic<br>AMS-10: cubic Pn3m | [18, 19]<br><br><br><br><br><br><br>[31] |
| MSU-1 | Tergitol; $C_{11-15}(EO)_{12}$ | neutral | disordered | [20] |
| MSU-2 | TX-114; $C_8Ph(EO)_8$<br>TX-100; $C_8Ph(EO)_{10}$ | neutral | disordered | [20] |
| MSU-3 | P64L; $EO_{13}PO_{30}EO_{13}$ | neutral | disordered | [20] |
| MSU-4 | Tween ®-20, 40, 60, 80 | neutral | disordered | [21] |
| MSU-V | $H_2N(CH_2)_nNH_2$ | neutral | lamellar | [22] |
| MSU-G | $C_nH_{2n+1}NH(CH_2)_2NH_2$ | neutral | lamellar | [23] |
| HMS | $C_nH_{2n+1}NH_2$ | neutral | disordered | [24] |

EO = ethylene oxide; PO = propylene oxide.
[a]Gemini surfactants $C_{n-s-n}$: $C_nH_{2n+1}N^+(CH_3)_2(CH_2)_sN^+(CH_3)_2C_nH_{2n+1}$.
[b]Divalent surfactants $C_{n-s-1}$: $C_nH_{2n+1}N^+(CH_3)_2(CH_2)_sN^+(CH_3)_3$.
[c]Divalent surfactant $18B_{4-3-1}$: $C_{18}H_{37}O$—$C_6H_4$—$O(CH_2)_4N^+(CH_3)_2(CH_2)_3N^+(CH_3)_3$.
[d]Bolaform surfactants: $(CH_3)_3N^+(CH_2)_nO$—$C_6H_4$—$C_6H_4$—$O(CH_2)_nN^+(CH_3)_3$.
[e]FC-4: $(C_3F_7O(CFCF_3CF_2O)_2CFCF_3CONH(CH_2)_3N^+(C_2H_5)_2CH_3I^-$.
[f]TMB: trimethylbenzene.
[g]Additives = TMB and KCl.
[h]Tri-head group surfactant: $C_{16}H_{33}N^+(CH_3)_2(CH_2)_2N^+(CH_3)_2(CH_2)_3N^+(CH_3)_3$.
[i]Additives = 3-mercaptopropyl-trimethoxysilane (MPTS) and benzene, or a benzene derivative (methyl-, ethyl-, dimethyl-, or trimethylbenzene).
[j](1,3-dimethyl-2-imidazolidin-2-ylidene)hexadecylmethylammonium bromide Table 1 References
[1] J. S. Beck, J. C. Vartuli, W. J. Roth, M. E. Leonowicz, C. T. Kresge, K. D. Schmitt, C. T-W. Chu, D. H. Olson, E. W. Sheppard, S. B. McCullen, J. B. Higgins and J. L. Schlenker, *J. Am. Chem. Soc.* 114 (1992) 10834.
[2] Q. Huo, R. Leon, P. M. Petroff and G. D. Stucky, *Science* 268 (1995) 1324.
[3] T. Yanagisawa, T. Shimizu, K. Kuroda and C. Kato, *Bull. Chem. Soc. Jpn.* 63 (1990) 988.
[4] Q. Huo, D. I. Margolese and G. D. Stucky, *Chem. Mater.* 8 (1996) 1147.
[5] Y. Sakamoto, M. Kaneda, O. Terasaki, D. Zhao, J. M. Kim, G. D. Stucky, H. J. Shin and R. Ryoo, *Nature* 408 (2000) 449.
[6] D. Zhao, Q. Huo, J. Feng, J. Kim, Y. Han and G. D. Stucky, *Chem. Mater.* 11 (1999) 2668.
[7] D. Zhao, Q. Huo, J. Feng, B. F. Chmelka and G. D. Stucky, *J. Am. Chem. Soc.* 120 (1998) 6024.
[8] D. Zhao, Q. Huo, J. Feng, B. F. Chmelka and G. D. Stucky, *Science* 279 (1998) 548.
[9] F. Kleitz, S. H. Choi and R. Ryoo, *Chem. Commun.* (2003) 2136.
[10] Y. Han, D. Li, L. Zhao, J. Song, X. Yang, N. Li, Y. Di, C. Li, S. Wu, X. Xu, X. Meng, K. Lin and F.-S. Xiao, *Angew. Chem. Int. Ed. Engl.* 42 (2003) 3633.
[11] B. L. Newalkar, S. Komarneni, U. T. Turaga and H. Katsuki, *J. Mater. Chem.* 7 (2003) 1710.
[12] P. Schmidt-Winkel, W. W. Lukens, Jr., D. Zhao, P. Yang, B. F. Chmelka and G. D. Stucky, *J. Am. Chem. Soc.* 121 (1999) 254.
[13] F. Kleitz, D. Liu, G. M. Anilkumar, I.-S. Park, L. A. Solovyov, A. N. Shmakov and R. Ryoo, *J. Phys. Chem. B.* 107 (2003) 14296.
[14] J. Fan, C. Yu, F. Gao, J. Lei, B. Tian, L. Wang, Q. Luo, B. Tu, W. Zhou and D. Zhao, *Angew. Chem. Int. Ed. Engl.* 42 (2003) 3146.
[15] C. Yu, Y. Yu and D. Zhao, *Chem. Commun.* (2000) 575.

TABLE 1-continued

Mesoporous Silicas and Organosilicas

| Mesophase | Amphiphile template | pH | Structure | Ref. |
|---|---|---|---|---|

[16] S. Shen, Y. Li, Z. Zhang, J. Fan, B. Tu, W. Zhou and D. Zhao, *Chem Commun.* (2002) 2212.
[17] X. Liu, B. Tian, C. Yu, F. Gao, S. Xie, B. Tu, R. Che, L.-M. Peng and D. Zhao, *Angew. Chem. Int. Ed. Engl.* 41 (2002) 3876.
[18] S. Che, A. E. Garia-Bennett, T. Yokoi, K. Sakamoto, H. Kumieda, O. Terasaki, T. Tatsumi, *Nature Mater.* 2 (2003) 801.
[19] A. E. Garia-Bennett, O. Terasaki, S. Che, T. Tatsumi, *Chem. Mater.* 16 (2004) 813.
[20] S. A. Bagshaw, E. Prouzet and T. J. Pinnavaia, *Science* 269 (1995) 1242.
[21] E. Prouzet, F. Cot, G. Nabias, A. Larbot, P. Kooyman and T. J. Pinnavaia, *Chem. Mater.* 11 (1999) 1498.
[22] P. T. Tanev, Y. Liang and T. J. Pinnavaia, *J. Am. Chem. Soc.* 119 (1997) 8616.
[23] S. S. Kim, W. Zhang and T. J. Pinnavaia, *Science* 282 (1998) 1302.
[24] P. T. Tanev and T. J. Pinnavaia, *Science* 267 (1995) 865.
[25] X. Zhou, S. Qiao, N. Hao, X. Wang, C. Yu, L. Wang, D. Zhao, and G. Q. Lu *Chem. Mater.* 19 (2007) 1870.
[26] Y. Deng, T. Yu, Y. Wan, Y. Shi, Y. Meng, D. Gu, L. Zhang, Y. Huang, C. Liu, X. Wu, D. Zhao, *J. Am. Chem. Soc.* 129 (2007) 1690.
[27] Y. Di, X. Meng, S. Li and F.-S. Xiao *Microporous Mesoporous Mater.* 82 (2005) 121.
[28] D. Li, Y. Han, J. Song, L. Zhao, X. Xu, Y. Di, F.-S. Xiao, *Chem.-A Eur. J.* 10 (2004) 5911.
[29] X. Yang, S. Zhang, Z. Qiu, G. Tian, Y. Feng, F.-S. Xiao, *J. Phys. Chem. B* 108 (2004) 4696.
[30] X. Meng, T. Di, L. Zhao, D. Jiang, S. Li, F.-S. Xiao, *Chem. Mater.* 16 (2004) 5518.
[31] T. Yokoi, T. Tatsumi, *J. Japan Petroleum Institute* 50 (2007) 299.

Following the initial preparation steps, the mesoporous silica can be calcined or solvent extracted to remove surfactant and, if necessary, characterised using X-ray diffraction, $N_2$ adsorption, scanning electron microscopy, and/or transmission electron microscopy.

The mesoporous silicas of the present invention include, but are not limited to, all mesoporous silicas described in Table 1. They are prepared in the presence of a structure directing agent which consists of a surfactant, oligomer, or polymer. The mesoporous material is then treated to remove the structure directing agent, either by heat treatment or by extraction.

Mesoporous silicas that are suitable for use in the present invention exhibit preferably high surface area, large pore volume and high degree of pore ordering. Such material shows a suitable combination of adsorption uptake, adsorption kinetics, separation efficiency and ease of regeneration using pressure swing adsorption (PSA).

Mesoporous silicas that are suitable for use in the present invention exhibit high surface areas and provide sufficiently large pores to enable relatively unhindered flow of $CO_2$, or other acid gases, containing gaseous streams inside the pore system. The resulted modified mesoporous silicas exhibit a high adsorption uptake, fast adsorption kinetics, high separation efficiency and ease of regeneration using temperature swing (TSA), pressure swing (PSA) adsorption or a combination of both temperature and pressure swing adsorption.

Adsorption Methods and Systems

The present invention further provides methods and systems for removing $CO_2$ and/or other acid gases, such as $H_2S$ and $SO_2$, using mesoporous silicas. For simplicity, the following discussion specifically refers to $CO_2$ as the acid gas.

Mesoporous silicas can be used successfully as an adsorbent for $CO_2$ under high pressure with desorption under moderate pressure. The terms "high pressure" and "moderate pressure", as used herein, refers to the operational pressure of greater than 10 bar and 2 bar for both adsorption and desorption stages, respectively, but preferably higher than 20 bar and 5 bar, respectively. It is noteworthy that conventional pressure swing adsorption (PSA) processes operate between a high loading pressure and 1 bar or vacuum for the desorption stage. Mesoporous silica adsorbents can be used for $CO_2$ bulk separation from different pre-dried gaseous streams. The proposed PSA-H/M using mesoporous silica is particularly suitable for simultaneous separation and recovery of $CO_2$ at high (e.g., H=45 bar) and medium (e.g., M=10 bar) pressures, respectively.

In accordance with another aspect of the present invention, there is provided a system for $CO_2$ adsorption. The system comprises a sorbent bed that includes a mesoporous silica and a means for contacting a gaseous stream containing $CO_2$ with the sorbent bed for a sufficient amount of time to permit adsorption of the $CO_2$ by the mesoporous silica.

Once the mesoporous silica adsorbent has been synthesized, it can be employed in a sorbent bed for use in an adsorption process, such as a cyclic adsorption-regeneration process. To apply the adsorbent of the present invention to such an adsorption process, it must be formed into a stable, mechanically strong form. These forms may include, but are not limited to, powder forms, pellet forms and monolithic structures or foams. In the case of pellet forms, the adsorbent is mixed with a suitable inert or active secondary material as a binder. Criteria for selecting a suitable binder can include (i) achieving pellets or extrudates with minimum amount of binder; (ii) enhanced mechanical stability; (iii) preservation of adsorbent porosity and accessibility of adsorption sites; and (iv) affordability. For example, siloxanes and siloxane derivatives can be employed with the appropriate weight percentage as binders for mesoporous silica to form structured pellets, extrudates or spheres. The selection of the appropriate form and, if necessary, additive, is based on the application of the adsorbent and the type of equipment used in the acid gas removal process. The selection and manufacture of the adsorbent form is well within the ordinary abilities of a worker skilled in the art.

Once the adsorbent form is selected and manufactured, it is used in a sorbent bed where a gaseous stream containing $CO_2$, and possibly water vapour, contacts the adsorbent. In the presence of mesoporous silica, the $CO_2$ interacts with the silica surface and is physically adsorbed.

According to a specific embodiment of the present invention, once the mesoporous silica is loaded with $CO_2$ to a satisfactory level, or at a designated cycle time, the sorbent bed can be regenerated. Regeneration comprises ceasing the flow of the acid gas containing stream through the bed and desorbing the adsorbed acid gas. The desorption is accomplished by pressure gradient means or by the use of a sweeping or purge gas, or any combination thereof. During this step, the adsorbed $CO_2$ is released and flushed or washed out of the sorbent bed. The adsorbent is then ready for re-use. In a specific example, in which the mesoporous silica is MCM-41-100 with pore diameter of 3.3 nm, $CO_2$ is removed at medium pressures, typically 2 to 5 bar or vacuum and the regenerated material is ready for re-use.

The $CO_2$ removed from the sorbent via a desorption process can be collected at low or medium pressure purge. The $CO_2$ thus recovered can be reused in a variety of applications or can be compressed for sequestration. As such, the present invention further provides a method of manufacturing $CO_2$, which method comprises the steps of adsorbing $CO_2$ on mesoporous silica and collecting the adsorbed $CO_2$ following desorption from mesoporous silica.

In one embodiment of the present invention, the use of the adsorbent to remove $CO_2$, another acid gas, or a combination thereof, can comprise utilising two or more sorbent beds operating cyclically such that the first bed is in the adsorption cycle while the second bed is in the desorption cycle. This system comprises two or more sorbent beds and computer or manually controlled valves and pumps allowing for continuous $CO_2$ and other acid gases removal from the gaseous stream.

In one embodiment of the present invention, mesoporous silicas can be used for the removal and recovery of $CO_2$, or other acid gases from streams containing in addition to $CO_2$, or other acid gases, other gases including, but not limited to, $H_2$, $N_2$, $O_2$, CO, $CH_4$ and other hydrocarbons using PSA-H/M. Gaseous streams include, but are not limited to, natural gas, biogas, syngas, stack gas and air.

In one embodiment of the present invention, if necessary, different amounts of humidity may be added during adsorption and/or desorption operation in PSA-H/M in fixed, moving or fluidized beds, to optimize the capture of $CO_2$.

In one embodiment of the present invention, mesoporous silicas can be used for the removal and recovery of $CO_2$, or other acid gases from streams containing in addition to $CO_2$, other gases including, but not limited to, $H_2$, $N_2$, $O_2$, CO, $CH_4$ and other hydrocarbons using wet (i.e., added moisture) adsorption processes, i.e., WPSA-H/M. Gaseous streams include, but are not limited to, natural gas, biogas, syngas, stack gas and air.

To gain a better understanding of the invention described herein, the following examples are set forth. It should be understood that these examples are for illustrative purposes only. Therefore, they should not limit the scope of this invention in any way.

EXAMPLES

Example 1

Preparation of MCM-41-X Mesoporous Silica

Figure 2:
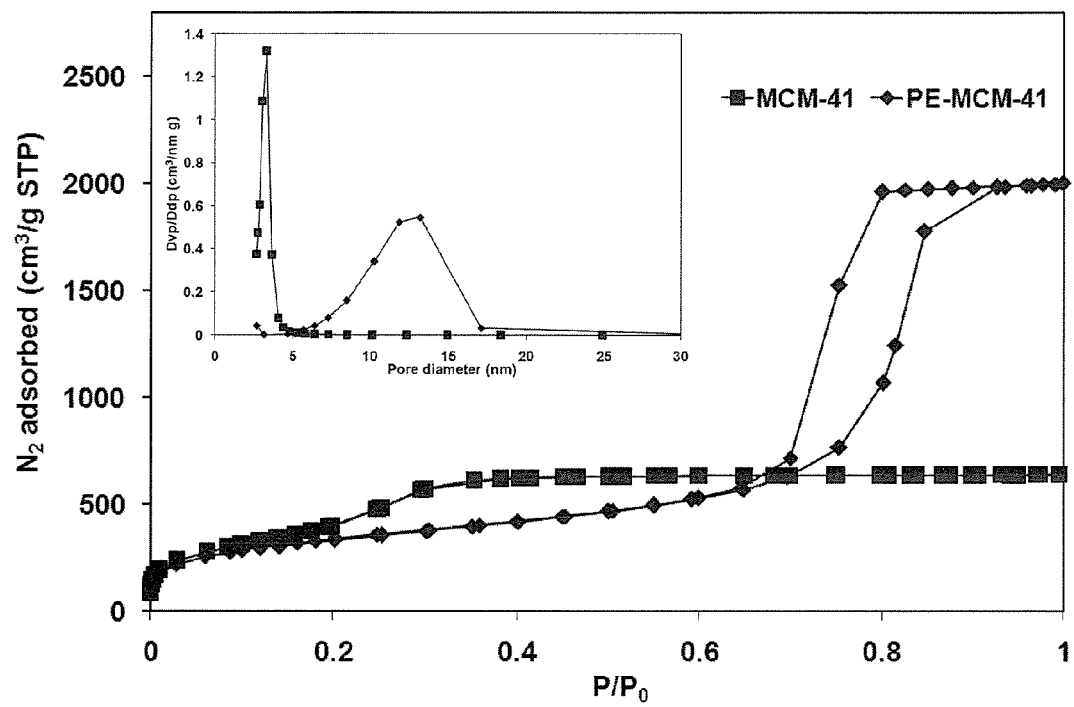
FIG. 2 shows $N_2$ adsorption isotherms for materials; the inset figure represents the pore size distributions.

FIG. 1 shows the procedure for the synthesis of periodic mesoporous MCM-41 silica. MCM-41-X silica where X is the synthesis temperature in degree celsius was prepared in the presence of cetyltrimethylammonium bromide (CTAB) using the overall mixture composition: 1.0 $SiO_2$:0.29 TMAOH:0.21 CTAB:60 $H_2O$. In a typical synthesis, 1.76 g of tetramethylammonium hydroxide (TMAOH) (25%) was diluted with 72 g of water before adding 5.1 g of CTAB under vigorous stirring. After 15 min, 4 g of Cab-O-Sil silica was added. The gel obtained after stirring for an additional 30 min was transferred into a Teflon-lined autoclave, and heated statically under autogenous pressure for 40 h at a temperature within the range of 298 to 403 K. The obtained materials were filtered washed extensively, dried, and calcined at 813 K. The structural properties of MCM-41-100 as determined by nitrogen adsorption were: 1490 $m^2/g$, 0.99 $cm^3/g$, 3.3 nm for the surface area, pore volume and pore diameter, respectively (FIG. 2).

Example 2

Preparation of Pore-Expanded MCM-41 (PE-MCM-41) Silica

FIG. 1 shows also the procedure for the post-synthesis pore expansion of MCM-41. The expander agent used for the preparation of PE-MCM-41 was dimethyldecylamine (DMDA). More details about the procedure may be found elsewhere (Serna-Guerrero and Sayari 2007; Harlick and Sayari 2007). Under appropriate conditions, i.e., DMDA/MCM-41 ratio, temperature and time of the post-synthesis hydrothermal stage, the pore size of MCM-41 can be expanded from ca. 3 nm up to ca. 25 nm. As shown earlier (Harlick and Sayari 2007), pore size tuning is critical for improved $CO_2$ adsorptive properties at high pressure. The structural properties for a PE-MCM-41 sample as determined by nitrogen adsorption were: 1230 $m^2/g$, 3.09 $cm^3/g$, 11.7 nm for the surface area, pore volume and pore diameter, respectively (FIG. 2).

Example 3

Method for Measurement of Adsorption Properties and Kinetics

Adsorption equilibrium and kinetics measurements of pure $CO_2$ were performed using a Rubotherm gravimetric-densimetric apparatus (Rubotherm, Bochum Germany), composed mainly of a magnetic suspension balance (MSB) and a network of valves, mass flowmeters and temperature and pressure sensors. It operates both in closed and open loops. In a typical adsorption experiment, the adsorbent was weighed and placed in a basket suspended by a permanent magnet through an electromagnet. The cell in which the basket is housed was then closed, and vacuum or high pressure was applied. This system is able to perform adsorption measurements in a wide range of gas pressure from 0 to 60 bar. The adsorption temperature may also be controlled within the range of 298 to 423 K. The clean (outgassed) adsorbent is exposed to flowing pure $CO_2$ at constant temperature at a rate of 100 ml/min. In a typical experiment for kinetic measurements, the gas was introduced in such a way to reach the desired pressure in 5-10 s. The change in the weight of the adsorbent sample as well as the pressure and temperature were measured continuously until the thermodynamic equilibrium was reached. The change in the weight of the adsorbent sample as well as the pressure and temperature were monitored continuously until the thermodynamic equilibrium was reached. The gravimetric method allows the direct measurement of the reduced mass $\Omega$. Correction for the buoyancy effect is required to determine the excess adsorbed amount $m_{excess}$ (Belmabkhout et al. 2004; Dreisbach et al. 2003) using equation 1, where $V_{adsorbent}$ and $V_{ss}$ refer to the volume of the adsorbent and the volume of the suspension system, respectively. These volumes were determined using the helium isotherm method by assuming that helium penetrates in all the open pores of the materials without being adsorbed (Sircar 2002; Belmabkhout et al. 2004). The density of the gas $\rho_{gas}$ was determined experimentally using a volume-calibrated titanium cylinder. By weighing this calibrated volume in the gas atmosphere, the local density of the gas was also determined. Simultaneous measurement of gas uptake and gas phase density as a function of pressure and temperature was thus possible.

$$\Omega = m_{excess} - \rho_{gas}(V_{adsorbent} + V_{ss}) \quad (1)$$

Example 4

Kinetics of $CO_2$ Adsorption

Figure 3:
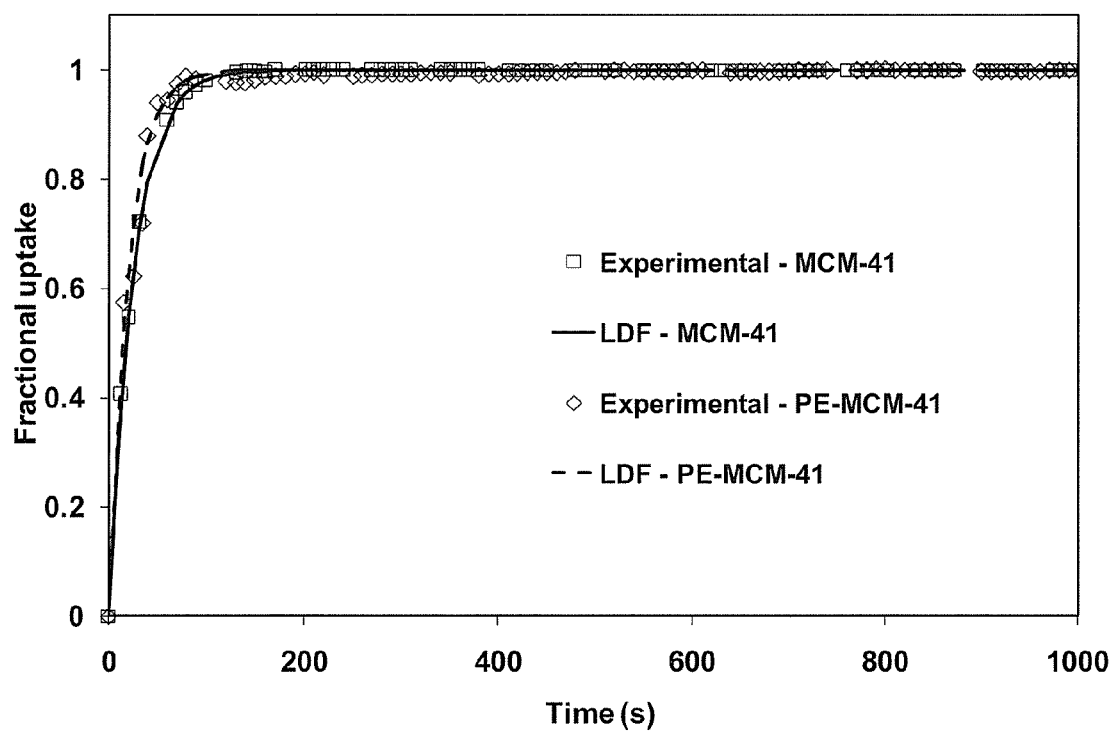
FIG. 3 graphically depicts fractional $CO_2$ uptake ($n_t/n_e$) at 1 bar and 298 K for MCM-41-100, PE-MCM-41.

FIG. 3 shows the kinetic curve for adsorption at 298 K and 1 bar over MCM-41-100, PE-MCM-41 materials determined using pure $CO_2$ flowing at 200 mL/min.

Figure 7:
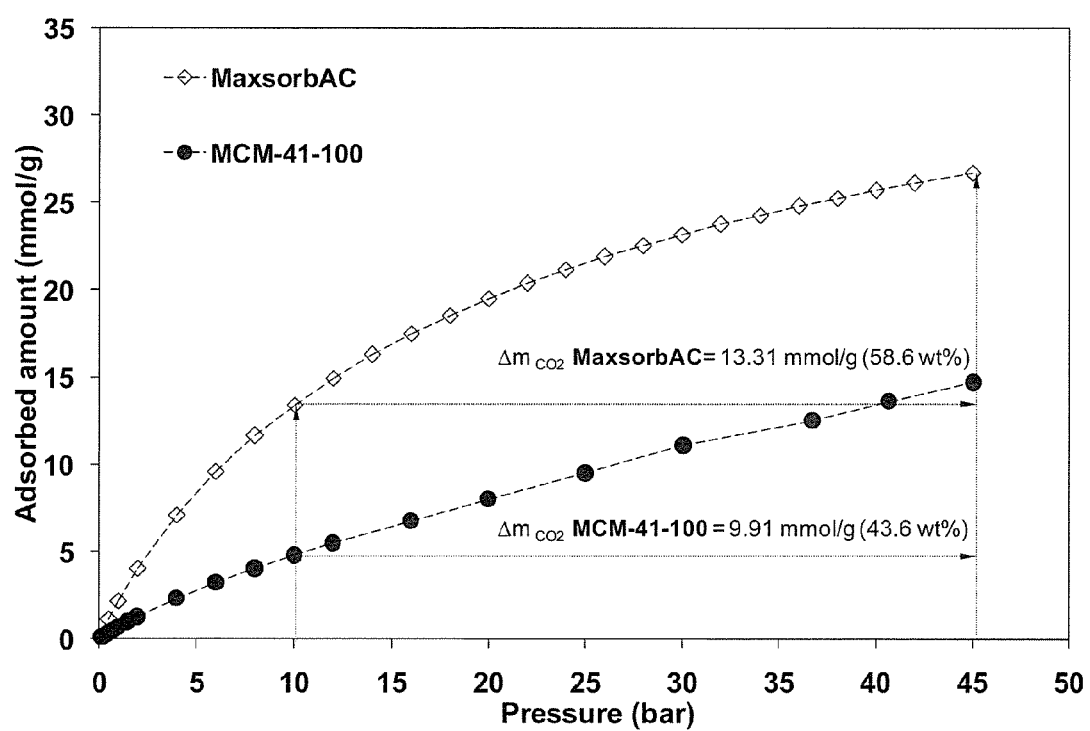
FIG. 7 depicts $CO_2$ excess adsorption isotherms for MCM-41-100 and MaxsorbAC at 298 K showing PSA-45/10 working $CO_2$ capacity when adsorption and desorption stages take place at 45 bar and 10 bar, respectively.

The $CO_2$ adsorption kinetic curves were fitted to Linear Driving Model (LDF) (Murcia et al. 2003), to estimate the kinetic rate constant of $CO_2$ adsorption. The LDF model is described by the equation 2:

$$\frac{n_t}{n_e} = 1 - e^{-kt} \quad (2)$$

where $n_e$ is the equilibrium uptake at 298 K and 1 bar, $n_t$ is the uptake at time t and k is the kinetic rate constant. The results of the fit are shown in FIG. 7 and Table 2. The $CO_2$ kinetic rate constant was significantly higher upon pore expansion, most likely due to the larger pores and higher pore volume of PE-MCM-41 in comparison to MCM-41-100. The PE-MCM-41 has higher kinetic rate constant than MCM-41-100, up to 0.5 fractional uptake $n_t/n_e$. The sequence in terms of LDF kinetic rate constant was PE-MCM-41>MCM-41-100.

TABLE 2

LDF kinetic rate constant of $CO_2$ adsorption

| Material | k (LDF kinetic rate constant)/s$^{-1}$ |
|---|---|
| MCM-41-100 | $4*10^{-2}$ |
| PE-MCM-41 | $6*10^{-2}$ |

Example 5

Comparison of MCM-41 Silica with Other Adsorbents

Figure 4:
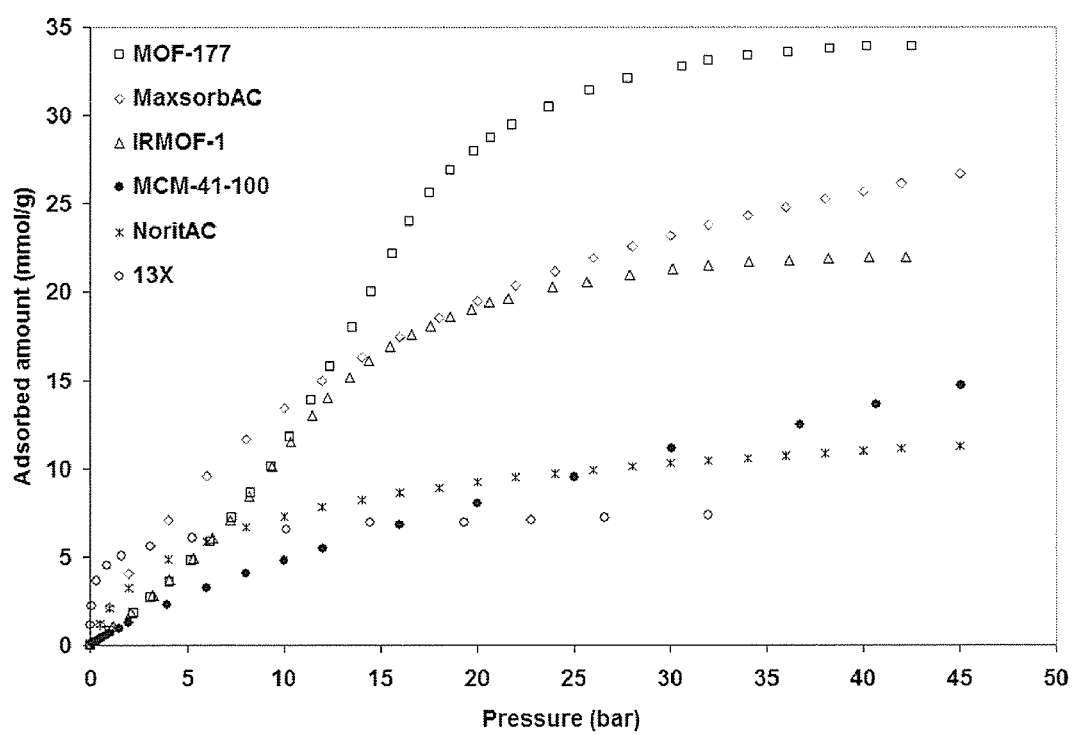
FIG. 4 graphically depicts gravimetric $CO_2$ excess adsorption uptake of MCM-41-100 in comparison with other adsorbents.
Figure 5:
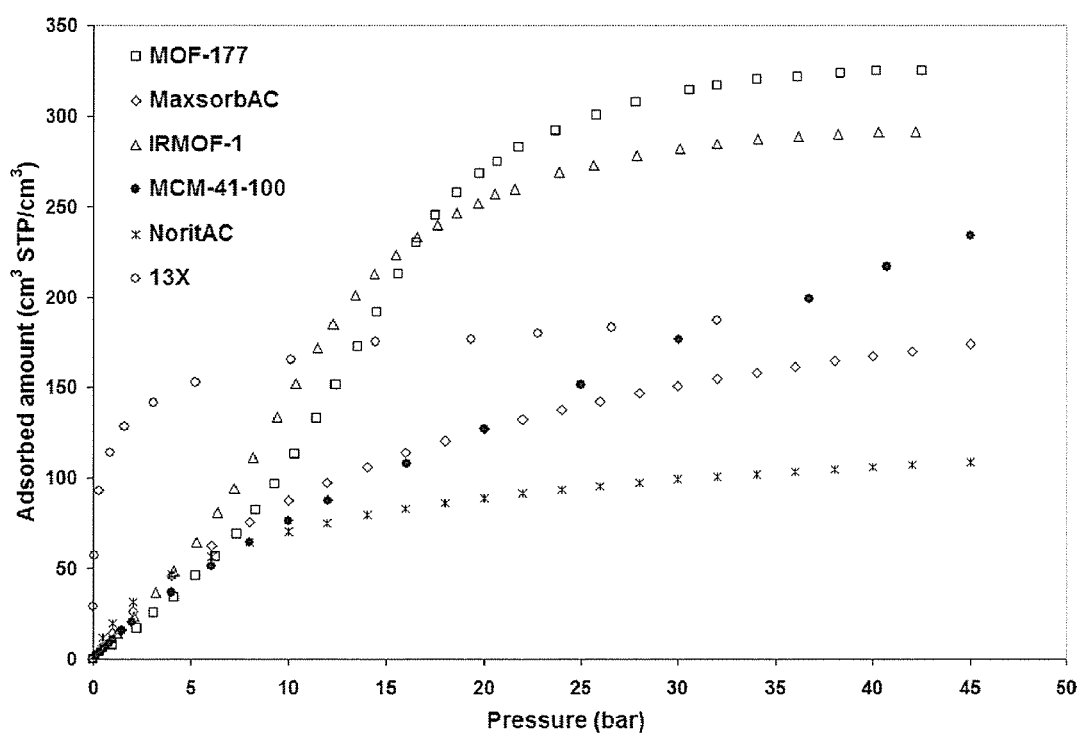
FIG. 5 shows volumetric $CO_2$ excess adsorption uptake for MCM-41-100 in comparison with other adsorbents.
Figure 6:
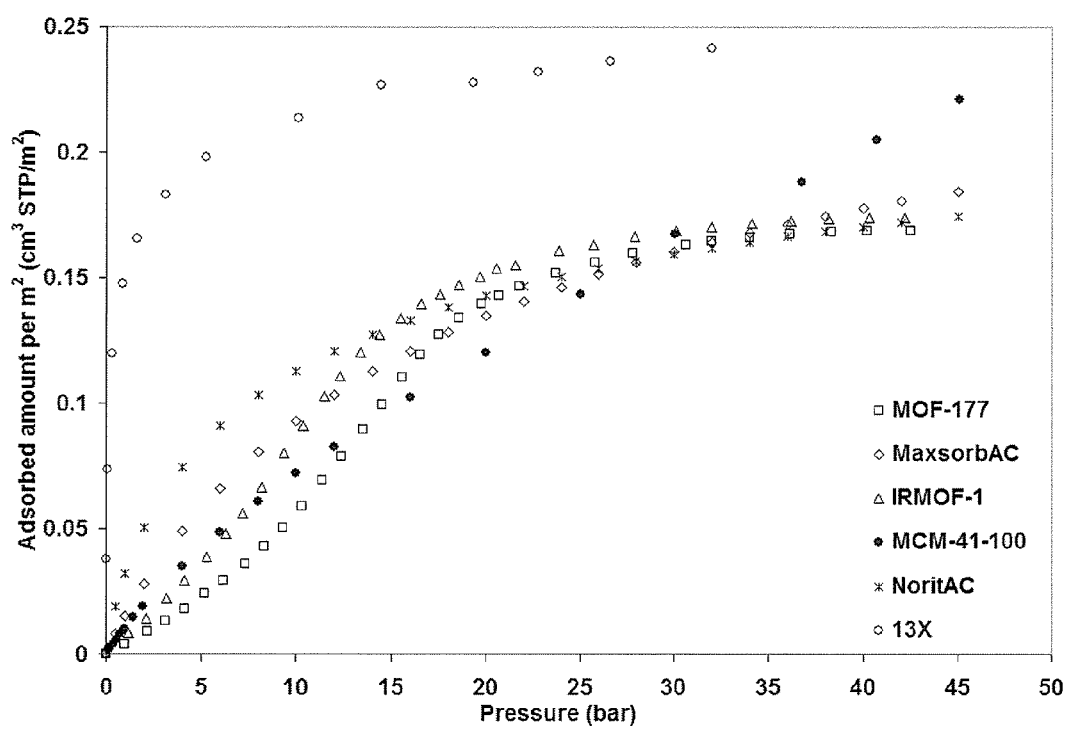
FIG. 6 shows volumetric $CO_2$ excess adsorption uptake per unit surface area for MCM-41-100 in comparison with other adsorbents.

Extensive investigations have been carried out on $CO_2$ adsorption using well known benchmark industrial adsorbents such as zeolites and carbon-based materials or the rapidly evolving hybrid materials, MOFs. Among these materials, the most promising $CO_2$ adsorbents were selected and compared with the current MCM-41-100 silica for $CO_2$ adsorption up to 45 bar pressure at ambient temperature. Pertinent properties of the selected materials are shown in Table 3. FIGS. 4, 5 and 6 show the $CO_2$ gravimetric, volumetric and volumetric per surface area excess uptakes of $CO_2$ on the above-mentioned materials in comparison to MCM-41-100 at ambient temperature. The comparison on a volume basis was made by multiplying the density of the corresponding material shown in Table 3 by the gravimetric $CO_2$ capacity in cm$^3$ STP/g. The particle density (ca. 0.71 g/cm$^3$) of MCM-41-100 was calculated from the experimentally determined skeletal density (2.34 g/cm$^3$) and the pore volume (ca. 0.99 cm$^3$/g).

TABLE 3

Surface area and density of the selected materials

| Materials | $S_{BET}$ (m$^2$/g) | Density (g/cm$^3$) | Reference |
|---|---|---|---|
| 13X | 685 | 1.13[a] | Belmabkhout et al. 2007; Cavenati et al. 2004 |
| MaxsorbAC | 3250 | 0.29[b] | Himeno et al. 2005 |
| NoritAC | 1450 | 0.43[b] | Himeno et al. 2005 |
| MOF-177 | 4508 | 0.43[c] | Millward and Yaghi 2005; Yang et al. 2008 |
| IRMOF-1 | 2833 | 0.59[c] | Millward and Yaghi 2005; Yang et al. 2008 |
| MCM-41-100 | 1490 | 0.71[a] | This work |

[a] particle density,
[b] packed density,
[c] crystallographic density

In terms of $CO_2$ gravimetric capacity, as shown in FIG. 4, MCM-41-100 exhibited the lowest capacity at low pressure but exceeded 13X zeolite and NoritAC carbon at a pressure of ca. 20 bar and 30 bar, respectively. At 45 bar, the $CO_2$ adsorption capacity for MCM-41-100 was 14.7 mmol/g vs. ca. 7.37 mmol/g and 11.28 mmol/g for 13X and NoritAC, respectively. The sequence of the gravimetric uptake at 45 bar was as follows: MOF-107>MaxsorbAC>IRMOF-1>MCM-41-100>NoritAC>13X.

In terms of $CO_2$ volumetric capacity, as shown in FIG. 5, MCM-41-100 outperformed 13X zeolite as well as NoritAC and MaxsorbAC carbons at high pressure, but exhibited lower volumetric capacity than MOF-177 and IRMOF-1. The sequence of the volumetric uptake at 45 bar was as follows MOF-107>IRMOF-1>MCM-41-100>MaxsorbAC>NoritAC>13X. Nevertheless, mesoporous silicas materials have the advantage of being very stable during prolonged exposure to ambient air and moisture (Cassiers et al. 2002). This is in contrast to MOF-177 and IRMOF-1 as reported recently (Li and Yang 2007; Bahr et al. 2007).

Comparison in terms of volumetric uptake on a surface area basis is provided in FIG. 6. MCM-41-100 exhibited comparable capacity at high pressure (ca. 45 bar) as 13X and exceeded slightly all the other aforementioned materials, indicative of the high surface efficiency of MCM-41-100 for $CO_2$ adsorption. Moreover, as shown in Table 4, MCM-41-100 exhibited one of the weakest adsorbent-$CO_2$ interactions, reflected by lower isosteric heat of adsorption, allowing $CO_2$ to desorb at very mild conditions, in contrast to 13X.

TABLE 4

Isosteric heat of $CO_2$ adsorption at low loading for MCM-41-100 and the benchmark adsorbents

| Material | $Q_{isos}$ (kJmol$^{-1}$) | References |
|---|---|---|
| 13X | 37.2 | Cavenati et al. 2004 |
| NoritAC | 22 | Himeno et al. 2005 |
| MCM-41-100 | 21.6 | This work |
| MaxsorbAC | 16.2 | Himeno et al. 2005 |

Figure 8:
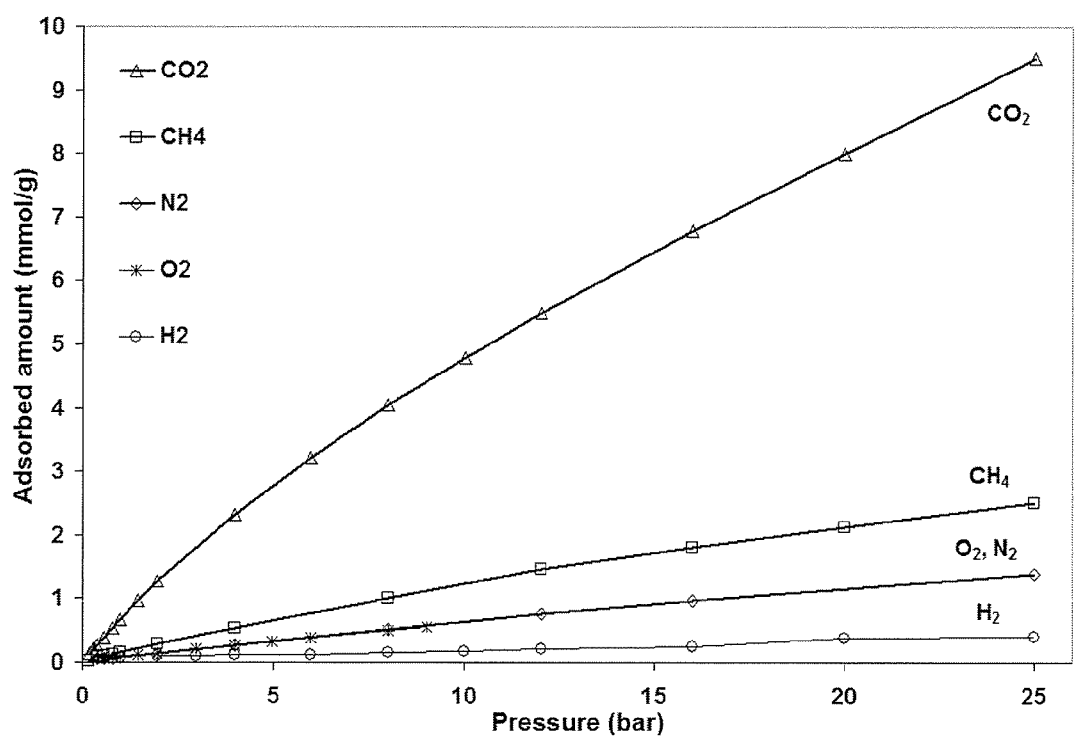
FIG. 8 depicts the adsorption isotherms of $CO_2$, $N_2$, $CH_4$, $H_2$ and $O_2$ on MCM-41-100 at 298 K.

The low gravimetric $CO_2$ adsorption capacity of MCM-41-100 at low to moderate pressures (1-10 bar) may seem to be unattractive for $CO_2$ separation in comparison to the benchmark commercial materials. It is however important to notice that the current MCM-41-100 exhibited ca. 43.6 wt % pure $CO_2$ operating PSA capacity (designated as $\Delta_{CO2}$) as shown in FIG. 7 based on 45 and 10 bar as pressures for the adsorption and desorption stages, respectively. This $CO_2$ uptake is lower than for MaxsorbAC (ca. 58.6 wt %) but significantly higher than for NoritAC (ca. 13.2 wt %) and 13X (3.7 wt %). Thus, MCM-41-100 can be used for example in PSA separation processes with the dual purpose of separation and recovery of $CO_2$ at moderate pressure (10 bar for example) from gas streams with medium to high $CO_2$ concentrations as shown in FIG. 8. This PSA configuration has the advantage to reduce the recompression cost of $CO_2$ prior the storage step. This process was designated as PSA-H/M where H and M stand for the high pressure adsorption and medium pressure desorption. It is noteworthy that conventional PSA processes operate between a high loading pressure and vacuum or 1 bar for the desorption stage Example 6

Adsorption of $CO_2$, $N_2$, $CH_4$, $O_2$ and $H_2$ on MCM-41-100

Figure 9:
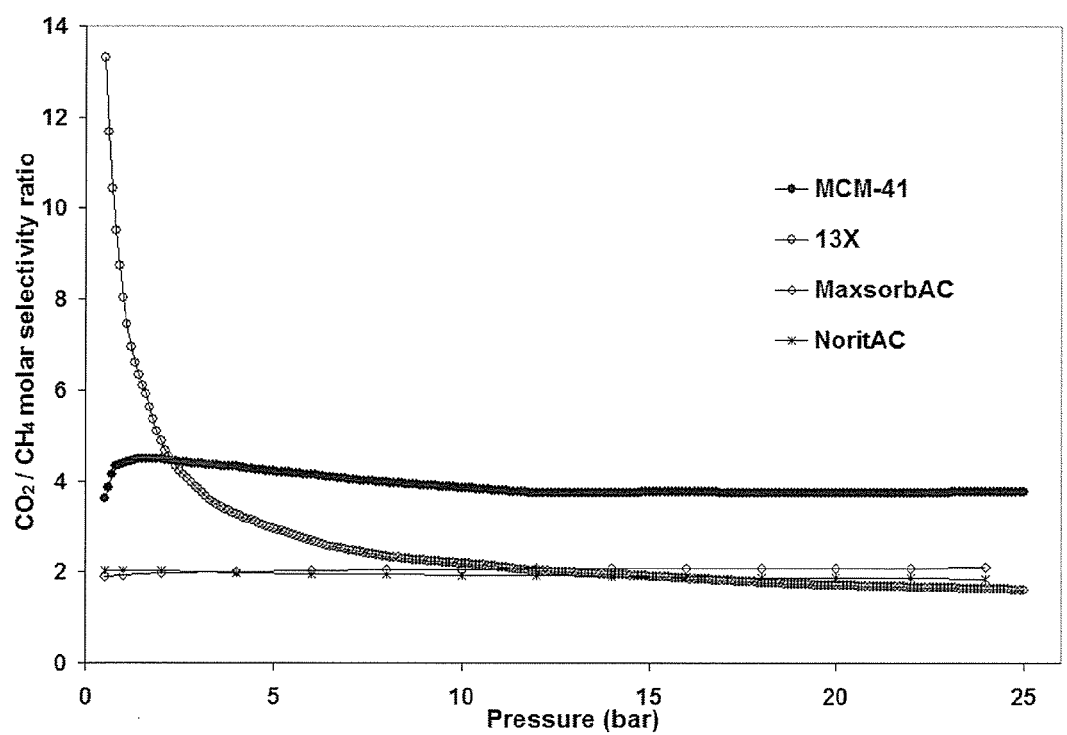
FIG. 9 shows the molar selectivity ratio of $CO_2$ to $CH_4$ adsorbed on MCM-41-100, 13X zeolite, MaxsorbAC and NoritAC at 298 K vs. pressure.

Adsorption isotherms of $CO_2$, $N_2$, $CH_4$, $H_2$ and $O_2$ onto MCM-41-100 at 298 K and up to 25 bar are shown in FIG. 8. The shape of the isotherms is reminiscent of Type I according to the IUPAC classification, with a much higher $CO_2$ adsorption capacity than other adsorbates over the whole pressure range. It is inferred that MCM-41-100 exhibits strong preferential adsorption of $CO_2$ compared to the other species. From the pure $CO_2$ and $CH_4$ data shown in FIG. 8, the molar selectivity ratio of the adsorbed $CO_2$ to $CH_4$ ($CO_2/CH_4$) was calculated as a function of pressure and plotted in FIG. 9. The corresponding molar selectivity ratios for 13X zeolite (Siriwardane et al. 2001, Cavaneti et al. 2004), MaxsorbAC and NoritAC (Siriwardane et al. 2001, Himeno et al. 2005) from literature data were also plotted in FIG. 9 for comparison.

At low pressure, the molar selectivity ratio $CO_2/CH_4$ for MCM-41-100 was lower than 13X but higher than both activated carbons. At pressures above ca. 3 bar, the molar selectivity ratio was higher for MCM-41-100 in comparison to all the other adsorbents, indicative of the higher efficiency of MCM-41-100 for separation of $CO_2$ from $CO_2$—$CH_4$ mixtures at moderate to high pressure. The sequence in terms of $CO_2/CH_4$ molar selectivity ratio at high pressure was MCM-41-100>NoritAC≈Maxsorb AC>13X. Similar trends were observed by comparing the molar selectivity ratio $CO_2/N_2$ on MCM-41-100 to the corresponding molar selectivity ratios for 13X (Siriwardane et al. 2001, Cavaneti et al. 2004), and NoritAC (Dreisbach et al. 2005), and by comparing the molar selectivity ratio $CO_2/H_2$ on MCM-41-100 to that for NaA (4A) zeolite (Akten et al, 2003).

Example 7

Comparison Between IAST $CO_2$—$N_2$ Binary Mixture Results and Experimental Data on MCM-41-100

Figure 10:
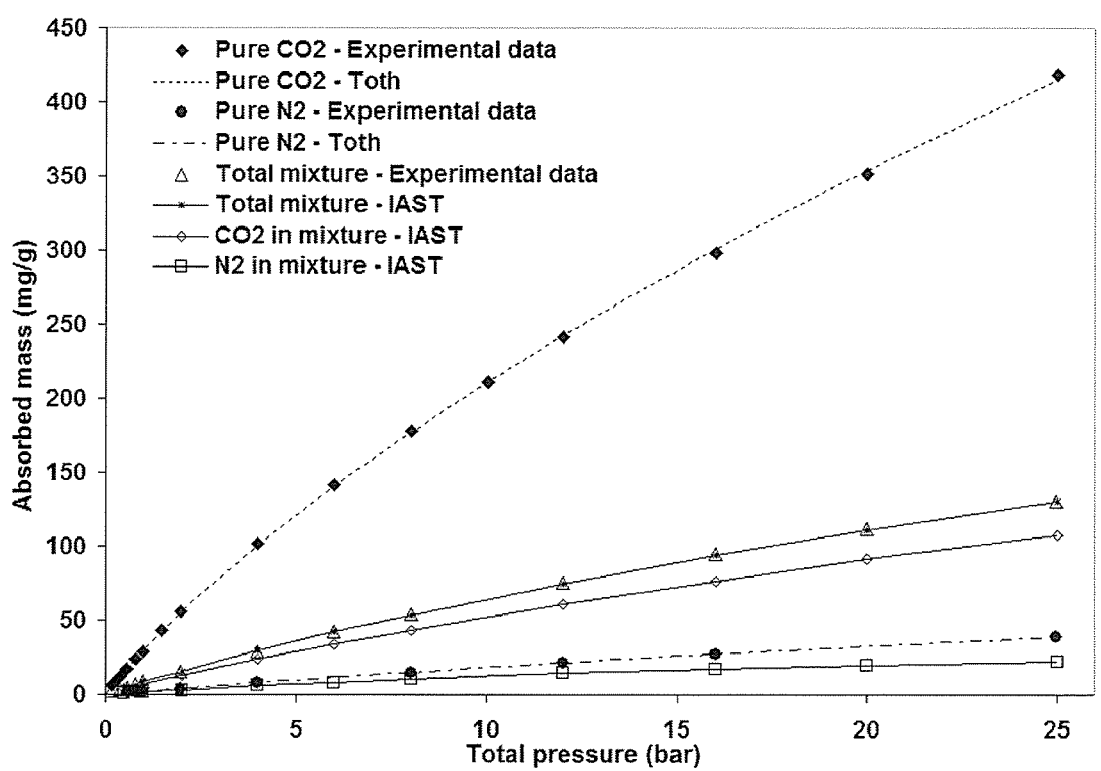
FIG. 10 shows IAST prediction compared to experimental data for adsorption of $CO_2$:$N_2$=20:80 mixture on MCM-41-100 at 298 K.

FIG. 10 presents the pure gas adsorption isotherms for $CO_2$ and $N_2$ on MCM-41-100, successfully fitted to Toth model equation, along with the results of IAST prediction for $CO_2$: $N_2$=20:80 mixture. The total amount adsorbed of $CO_2$—$N_2$ mixture is in excellent agreement with the experimental data over a wide range of pressure, indicative of the suitability of IAST, combined with Toth model, for the prediction of binary adsorption equilibria on MCM-41-100 as already recognized by other workers (He and Seaton 2006; Yun et al. 2002). Therefore, the selectivity of $CO_2$ over $N_2$, $CH_4$, $H_2$ and $O_2$, as function of pressure, has been mapped systematically using IAST. The $CH_4$, $O_2$ and $H_2$ adsorption isotherms were also fitted to Toth model. The overall results of the fit for the pure gas adsorption of $CO_2$, $N_2$, $CH_4$, $H_2$ and $O_2$ are presented in Table 5.

TABLE 5

Parameters of Toth equation for adsorption of pure gases on MCM-41-100 at 298 K

| Pure gas | Toth model parameters | | |
|---|---|---|---|
| | $q_s$ (mmol/g) | b (1/bar) | m |
| $CO_2$ | 145.9 | 5.8 * $10^{-3}$ | 0.44 |
| $N_2$ | 4.2 | 1.7 * $10^{-2}$ | 1.23 |
| $CH_4$ | 10.4 | 1.4 * $10^{-2}$ | 0.85 |
| $H_2$ | 434.2 | 1 * $10^{-4}$ | 0.22 |
| $O_2$ | 14.5 | 5.2 * $10^{-3}$ | 0.64 |

Example 8

Figure 11:
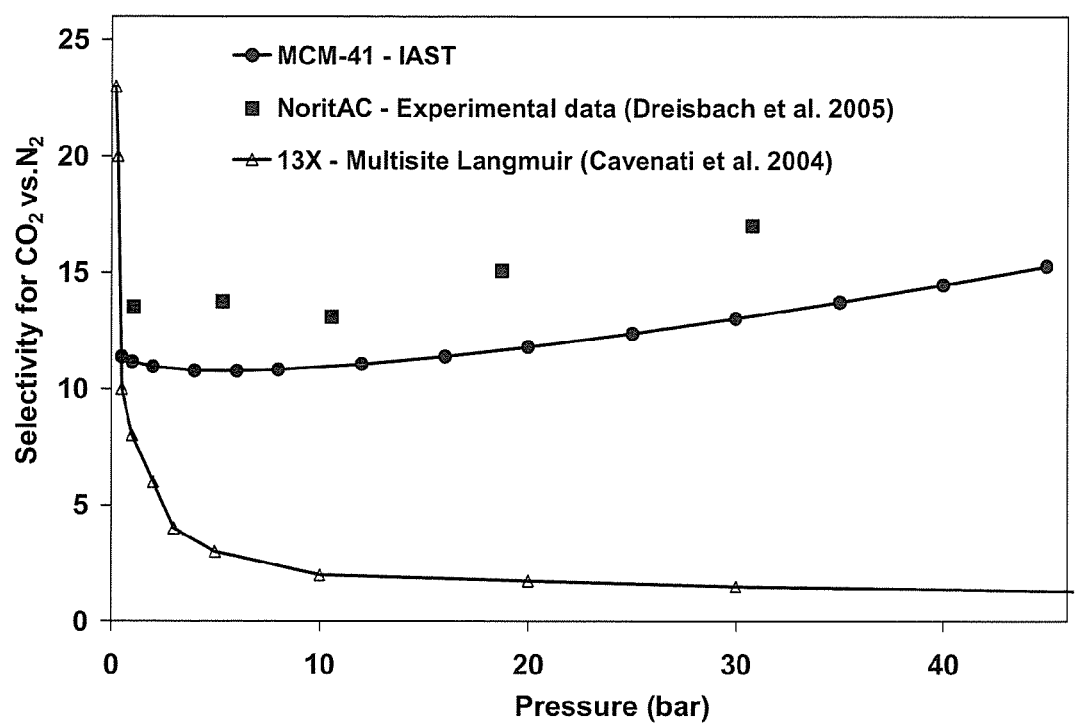
FIG. 11 shows IAST $CO_2$ selectivity over $N_2$ for $CO_2$:$N_2$=20:80 mixture over MCM-41-100 compared to NoritAC and 13X at 298 K vs. pressure.

$CO_2$ Adsorption Capacity and Selectivity on MCM-41-100 for $CO_2$:$N_2$=20:80 Mixture The most important binary system involved in flue gas separation is $CO_2$—$N_2$ mixture with a typical molar composition of 10-20% of $CO_2$ and ca. 80% $N_2$. FIG. 11 shows the selectivity of MCM-41-100 for $CO_2$ vs. $N_2$ for 20 mol % $CO_2$ in $N_2$ as a function of pressure. The corresponding data for NoritAC (Dreisbach et al. 2005) carbon and 13X (Cavenati et al, 2004) zeolite were also included for comparison.

The selectivity of MCM-41-100 for $CO_2$ over $N_2$ in the presence of $CO_2$:$N_2$=20:80 mixture was found to be around 11 in the range of 1 to 10 bar range with a tendency to increase up to ca. 15 as the pressure increased to 45 bar. The sequence in terms of $CO_2$ selectivity versus $N_2$ at high pressure was as follows: NoritAC>MCM-41-100>>13X. At very low pressure, 13X zeolite exhibited higher $CO_2$ vs. $N_2$ selectivity than all the other materials; however, the selectivity decreased steeply at increased pressure (Cavenati et al. 2004). Separation of $CO_2$ from $CO_2$—$N_2$ mixtures using other nanoporous materials has also been widely investigated both experimentally and theoretically. For example, at ambient temperature and moderate pressure, $CO_2$ vs. $N_2$ selectivity was found to be 12-18 for carbonaceous materials with slit-shaped pores (Cracknell and Nicholson 1996), 100 for ITQ-3 (Goj et al. 2002), 14 for MFI-type zeolites (Bernal et al. 2004), 4 for MOF-508b (Bastin et al. 1996) and 20 for Cu-BTC MOFs (Yang et al. 2007).

Table 6 shows the PSA-45/10 $CO_2$ removal capacity for MCM-41-100 and NoritAC in the presence of $CO_2$:$N_2$=20:80 mixture calculated using IAST. Although NoritAC exhibited somewhat higher $CO_2$ selectivity, MCM-41-100 still has a slightly higher PSA-H/M $CO_2$ adsorption capacity in the presence of $CO_2$:$N_2$=20:80 mixture. Thus, MCM-41-100 has suitable properties for $CO_2$ separation from flue gas at high pressure.

TABLE 6

PSA-H/M removal capacity of $CO_2$ in $CO_2$: $N_2$ = 20:80 mixture for MCM-41-100 and NoritAC (adsorption at 45 bar, desorption at 10 bar)

| Adsorbent | PSA-45/10 $CO_2$ capacity in mmol/g and (wt %) |
|---|---|
| MCM-41-100 | 2.58 (11.13 wt %) |
| NoritAC | 2.37 (10.4 wt %) |

Example 9

Figure 12:
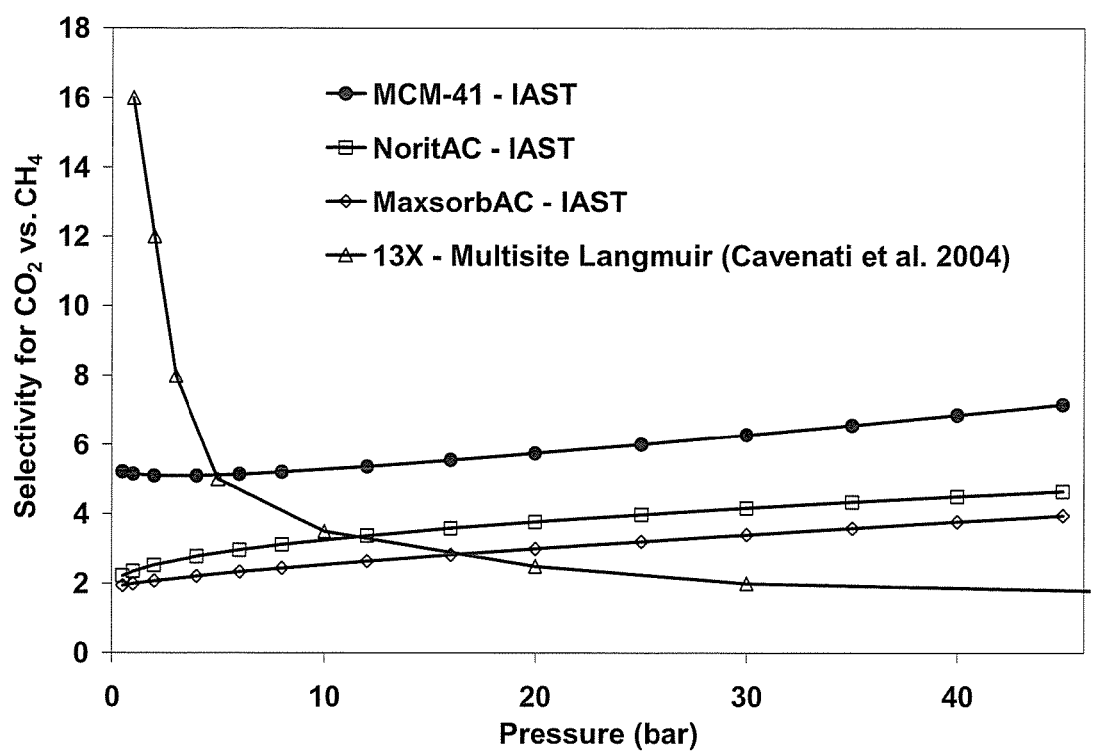
FIG. 12 shows IAST $CO_2$ selectivity over $CH_4$ vs. pressure for $CO_2$:$CH_4$=50:50 mixture on MCM-41-100 compared to NoritAC, MaxsorbAC and 13X at 298 K.

$CO_2$ Adsorption Capacity and Selectivity on MCM-41-100 for $CO_2:CH_4=50:50$ Mixture The most important binary system involved in biogas separation, purification processes is $CO_2$—$CH_4$ mixture with a molar composition of 25 to 50% and 50 to 75% for $CO_2$ and $CH_4$, respectively. FIG. 12 shows the selectivity of MCM-41-100 for $CO_2$ versus $CH_4$ in the presence of $CO_2:CH_4=50:50$. The corresponding literature data for benchmark materials like NoritAC, MaxsorbAC carbons and 13X zeolite were also included for comparison.

The MCM-41-100 $CO_2$ vs. $CH_4$ selectivity for $CO_2:CH_4=50:50$ mixture was found to be around 5 at low pressure, and showed an upward tendency up to ca. 7 as the pressure increased to 45 bar. The experimental data for NoritAC (Dreisbach et al. 2005; Himeno et al. 2005) were in good agreement with the IAST prediction based on pure $CO_2$ and $CH_4$ data (Himeno et al. 2005). MCM-41-100 had the highest $CO_2$ vs. $CH_4$ selectivity at moderate to high pressure for $CO_2:CH_4=50:50$ ca. >5 bar. Zeolite 13X exhibited higher $CO_2$ selectivity than all the other materials in the low pressure range (ca. <5 bar), but the selectivity decreased drastically by increasing the pressure (Cavenati et al. 2004). The sequence in terms of $CO_2$ vs. $CH_4$ selectivity for $CO_2:CH_4=50:50$ at high pressure was MCM-41-100>NoritAC≈Maxsorb AC>13X, similar to that observed in FIG. 10 based on the molar $CO_2/CH_4$ selectivity ratios. The separation of $CO_2$ from $CO_2$—$CH_4$ mixtures has also been investigated experimentally and theoretically for other nanoporous materials including MOFs and carbon nanotubes. For example, under similar conditions of pressure, temperature and composition, the $CO_2$—$CH_4$ selectivity was reported to be 3 for IRMOF-1 (Yang and Zhong 2006; Babarao et al. 2007) and MOF-508b (Bastin et al. 1996), 10 for Cu-BTC (Yang and Zhong 2006) and 11 for carbon nanotubes (Huang et al. 2007). Llewellyn et al. (2006) reported molar $CO_2/CH_4$ selectivity ratio of 1.8 and 38.5 at 20 bar and 304 K on dehydrated and hydrated MIL-53(Cr), respectively. Llewellyn et al. also (2008) reported molar $CO_2/CH_4$ selectivity ratio of ca. 3 at 50 bar and 303 K on Mil-101c.

Table 7 shows the $CO_2$ PSA-45/10 capacity for $CO_2:CH_4=50:50$ mixture over MCM-41-100 and other benchmark adsorbents calculated using IAST. The sequence of $CO_2$ PSA-H/M removal capacity using $CO_2:CH_4=50:50$ mixture was in good agreement with the pure $CO_2$ capacity sequence mentioned previously.

TABLE 7

PSA-H/M removal capacity of $CO_2$ from $CO_2$:
$CH_4 = 50:50$ mixture for MCM-41-100, NoritAC
and MaxsorbAC (adsorption at 45 bar, desorption at 10 bar)

| Adsorbent | PSA-45/10 $CO_2$ capacity in mmol/g and (wt %) |
|---|---|
| MCM-41-100 | 5.40 (23.7 wt %) |
| NoritAC | 3.44 (15.2 wt %) |
| MaxsorbAC | 9.44 (41.5 wt %) |

Example 10

Figure 13:
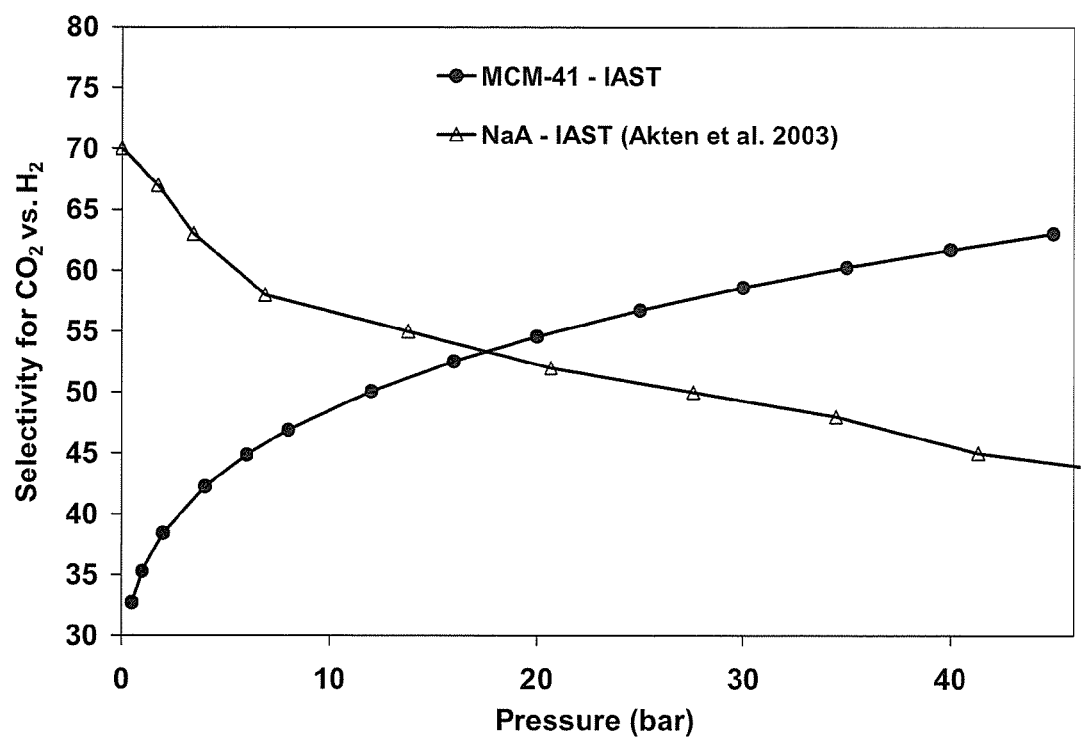
FIG. 13 shows IAST $CO_2$ selectivity over $H_2$ for $CO_2$:$H_2$=20:80 mixture on MCM-41-100 compared to IAST $CO_2$ selectivity over $H_2$ for $CO_2$:$H_2$=1.4:98.6 mixture for NaA zeolite at 298 K vs. pressure

$CO_2$ Adsorption Capacity and Selectivity on MCM-41-100 for $CO_2:H_2=20:80$ Mixture The most important binary system involved in pre-dried synthesis gas for hydrogen production is $CO_2$—$H_2$ mixture. The typical molar composition of dry synthesis gas after the water gas shift process in typically 20 to 30% $CO_2$ and 70 to 80% $H_2$. FIG. 13 shows the $CO_2$ vs. $H_2$ selectivity for $CO_2:H_2=20:80$ mixture as a function of pressure for MCM-41-100 compared to the corresponding literature data, available for NaA zeolite (Akten et al. 2003).

NaA zeolite exhibited higher selectivity than MCM-41-100 at pressure up to ca. 18 bar. However at higher pressure, MCM-41-100 outperformed NaA reaching a $CO_2$ vs. $H_2$ selectivity of 63 for $CO_2:H_2=20:80$ at 45 bar. The PSA-45/10 $CO_2$ removal capacity in the presence of $CO_2:H_2=20:80$ for MCM-41-100, calculated using IAST was 3.1 mmol/g (13.3 wt %). Notice that neglecting the buoyancy effect on the adsorbed phase in pure $H_2$ adsorption data may lead to a slight overestimation of the selectivity using IAST. Separation of equimolar mixture of $CO_2$ and $H_2$ has also been performed on other nanoporous materials like carbon and MOFs. At 50 bar and room temperature, the $CO_2$ vs. $H_2$ selectivity was reported to be 35 for activated carbon (Cao and Wu 2005), 25 for MOFs-5 (IRMOF-1) (Yang and Zhong 2006) and 60 for Cu-BTC (Yang and Zhong 2006). Thus, MCM-41-100 is also a promising material for carbon dioxide removal from synthesis gas at high pressure.

Example 11

Figure 14:
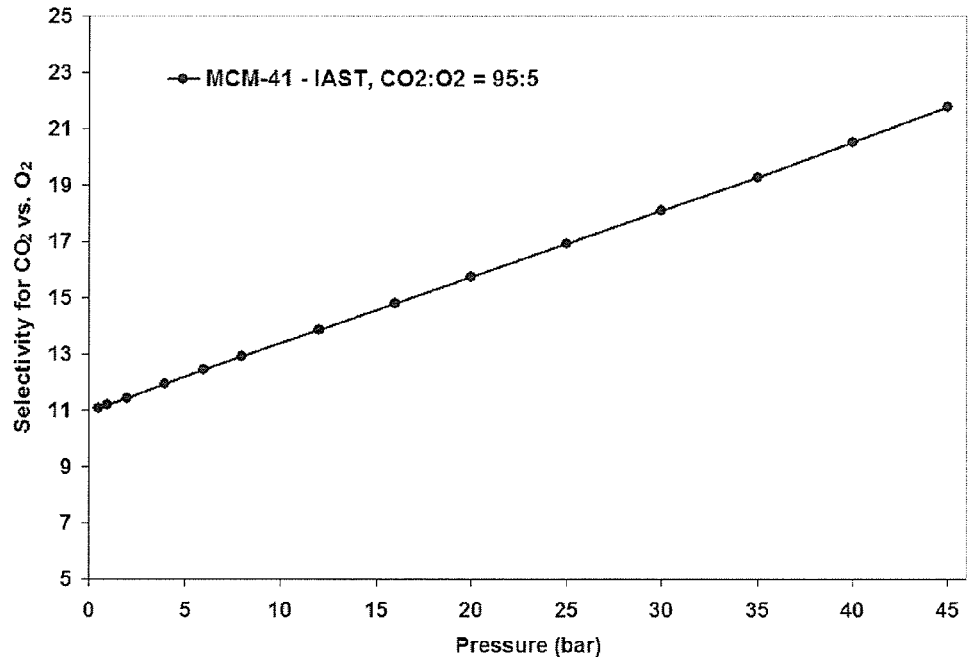
FIG. 14 shows IAST $CO_2$ selectivity over $O_2$ for $CO_2$:$O_2$=95:5 mixture for MCM-41-100 at 298 K vs. pressure.

$CO_2$ Adsorption Capacity and Selectivity on MCM-41-100 for $CO_2:O_2=95:5$ Mixture Although the $CO_2$—$N_2$ mixture is the most dominant in flue gas, investigation of $CO_2$—$O_2$ mixtures is also important. The molar composition of $O_2$ in flue gas is typically 2 to 5%. Ideally the selectivity of $CO_2$ in $CO_2$—$O_2$ mixtures should be as high as for $CO_2$—$N_2$ mixtures. FIG. 14 representing the $CO_2$ vs. $O_2$ selectivity for $CO_2:O_2=95:5$ as a function of pressure for MCM-41-100 shows a linear tendency with pressure. A $CO_2$ vs. $O_2$ selectivity of 22 was obtained at 45 bar. The PSA-45/10 $CO_2$ removal capacity for MCM-41-100 in the presence of a $CO_2:O_2=95:5$ mixture for MCM-41-100, calculated using IAST, was 8.9 mmol/g (39.3 wt %). Adsorption of $CO_2$—$O_2$ mixtures was rarely studied in the literature. At 50 bar and room temperature, the $CO_2$ selectivity in $CO_2:O_2=77.8:22.2$ mixture in the presence of Cu-BTC was reported to be 35 (Yang et al. 2007).

Example 12

$CO_2$ Capture Using PSA-H/M with Mesoporous Silica

Figure 15:
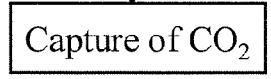
FIG. 15 schematically depicts the general procedure for $CO_2$ capture.
Figure 15:
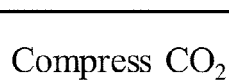

A simplified general scheme for $CO_2$ capture, from different gas streams, is presented in FIG. 15. It is composed of a $CO_2$ removal stage using suitable technology (e.g., absorption, membrane, adsorption using PSA, etc), and a $CO_2$ compression step before the final $CO_2$ storage. In this scheme, the capture step operates generally at atmospheric to moderate pressure and the $CO_2$ is recovered at low pressure when PSA is used.

Figure 16:
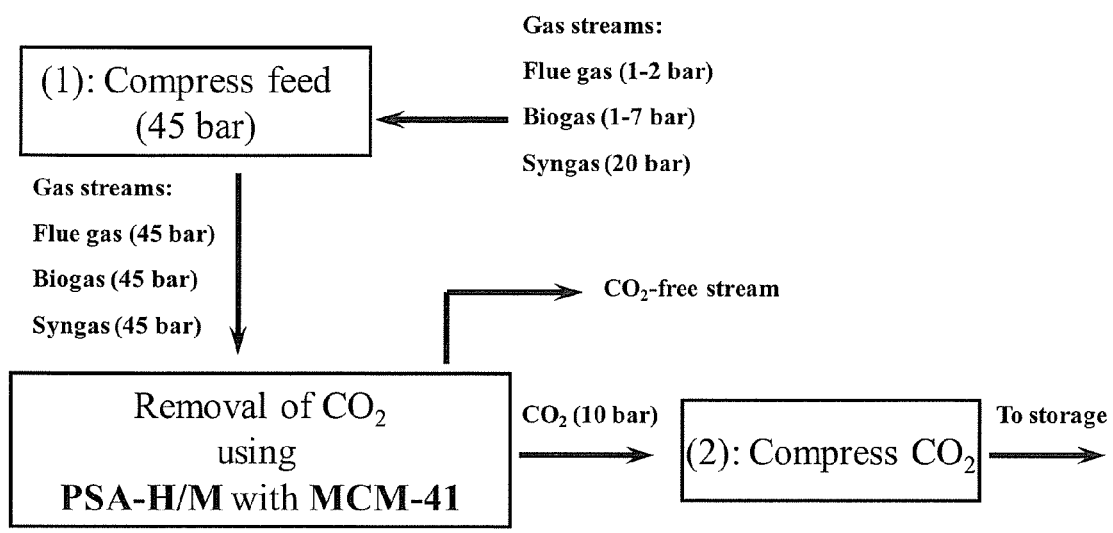
FIG. 16 schematically depicts the proposed procedure for $CO_2$ capture using PSA-H/M with H=45 bar and M=10 bar.

FIG. 16 illustrates the proposed $CO_2$ capture scheme incorporating PSA-H/M using mesoporous silica as adsorbent. The proposed scheme involves two compression stages. Initially the gas feed is compressed (e.g., 45 bar), the $CO_2$ is removed at high pressure and recovered at moderate pressure (e.g., 10 bar) before the final compression (if necessary) and storage steps.

Example 13

CO$_2$ Adsorption on Dry and Hydrated PE-MCM-41

Figure 17:
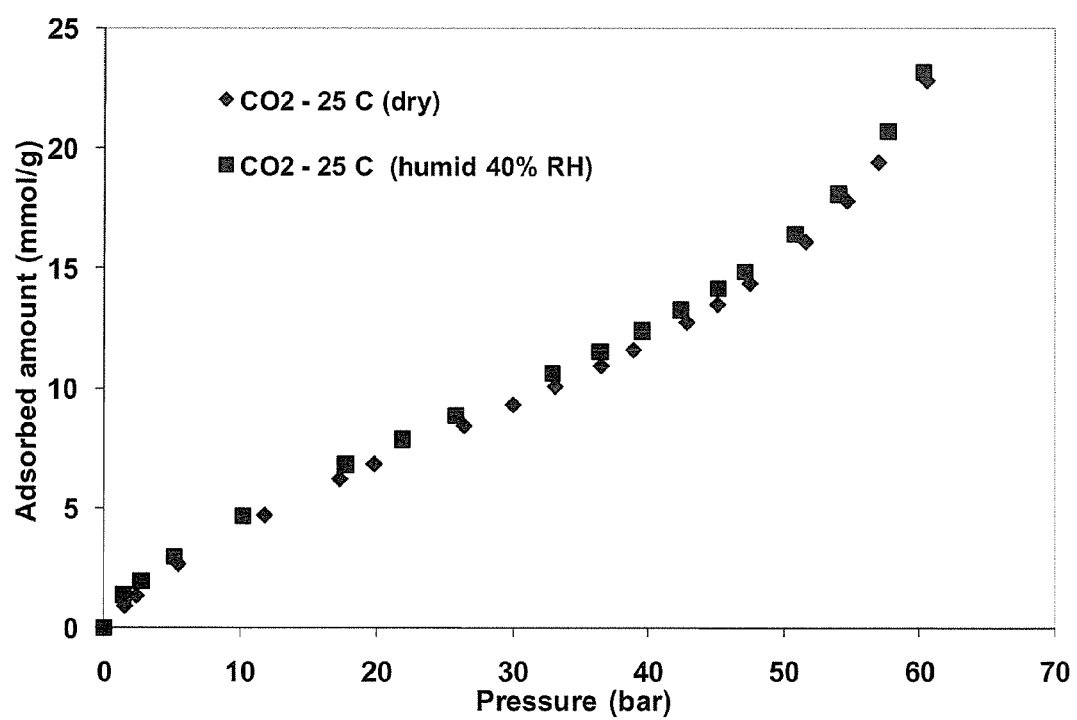
FIG. 17 depicts gravimetric $CO_2$ excess adsorption uptake of PE-MCM-41-100 in dry and hydrated conditions.

FIG. 17 shows the CO$_2$ adsorption isotherms of dry and hydrated (40% RH) PE-MCM-41 at room temperature and high pressure. The CO$_2$ adsorption uptake was 100 wt % (22.8 mmol/g) and 102 wt % (23.2) at 60 bar and room temperature. The pure CO$_2$ PSA-60/10 operating capacity for the dry and hydrated material was ca. 80 wt % and 81 wt %, respectively.

REFERENCES

Akten, E. D., Siriwardane, R., Sholl, D. S. Monte Carlo simulation of single- and binary-component adsorption of CO$_2$, N$_2$ and H$_2$ in zeolite Na-4A. *Energy & Fuels* 2003, 17, 977.

Babarao, R., Hu, Z., Jiang, J. Storage and separation of CO$_2$ and CH$_4$ in Silicalite, C168 Schwarzite, and IRMOF-1. A comparative study from Monte Carlo simulation. *Langmuir* 2007, 23, 659.

Bahr, D. F., Reid, J. A., Mook, W. M., Bauer, C. A., Stumpf, R., Skulan, A. J., Moody, N. R., Simmons, B. A., Shindel, M. M., Allendorf, M. D. Mechanical properties of cubic zinc carboxylates IRMOF-1 metal-organic framework crystals. *Phys. Rev. B.* 2007, 76, 184106.

Bastin, L., Barcia, P. S., Hurtado, E. J., Silva, J. A. C., Rodrigues, A. E., Chen, B. A microporous metal-organic framework for separation of CO$_2$/N$_2$ and CO$_2$/CH$_4$ by fixed-bed adsorption. *J. Phys. Chem. C* 1996, 112, 1575.

Belmabkhout, Y., Pirngruber, G., Jolimaitre, E., Methivier, A. A complete experimental approach of synthesis gas separation studies using static gravimetric and dynamic inverse chromatographic methods. *Adsorption* 2007, 13, 341.

Belmabkhout, Y., Frère, M., De Weireld, G. High-pressure adsorption measurements. A comparative study of the volumetric and gravimetric methods. *Meas. Sci. Technol.* 2004, 15, 848.

Bernal, M. P., Coronas, J., Menéndez, M., Santamaria, J., 2004. Separation of CO$_2$/N$_2$ mixtures using MFI-type zeolites membrane. *AIChE J.* 50, 127-135.

Bourrelly, S., Llewellyn, P. L., Serre, C., Millange, F., Loiseau, T., Férey, G. Different adsorption behaviors of methane and carbon dioxide in the isotypic nanoporous metal terephthalates MIL-53 and MIL-47. *J. Am. Chem. Soc.* 2005, 127, 13519.

Branton, P. K., Hall, P. G., Treguer, M., Sing, K. S. W. Adsorption of carbon dioxide, sulphur dioxide and water vapour by MCM-4, a model mesopourous adsorbent. *J. Chem. Soc. Faraday. Trans.* 1995, 91, 2041.

Cassiers, K., Linssen, L., Mathieu. M., Benjelloun, M., Schrijnemakers, K., Van Der Voort, P., Cool, P., Vansant. E. F. A detailed study of thermal, hydrothermal, and mechanical stabilities of a wide range of surfactant assembled mesopourous silicas. *Chem. Mater.* 2002, 14, 2317.

Cavenati, S., Grande, C. A., Rodrigues, A. E. Adsorption equilibrium of methane, carbon dioxide, and nitrogen on zeolites 13X at high pressures. *J. Chem. Eng. Data* 2004, 49, 1095.

Cavenati, S., Grande, C. A., Rodrigues, E. E. Separation of CH$_4$/CO$_2$/N$_2$ mixtures by layered pressure swing adsorption for upgrade of natural gas. *Chem. Eng. Sci.* 2006, 61, 3893.

Cracknell, R. F., Nicholson, D. Adsorption and selectivity of carbon dioxide with methane and nitrogen in slit-shaped carbonaceous micropores: Simulation and experiments. *Adsorption* 1996, 2, 193.

Comoti, A., Bracco, S., Valsesia, P., Ferreti., L., Sozzani, P. 2D multinuclear NMR, hyperpolarized xenon and gas storage in organosilica nanochannels with crytalline order in the Walls. *J. Am. Chem. Soc.* 2007, 129, 8566.

Do, D. D., Wang, K. A new model for the description of adsorption kinetics in heterogeneous activated carbon. *Carbon* 1998, 36, 1539.

Dreisbach, F., Seif, R., Losch, H. W. Adsorption equilibria of CO/H$_2$ with a magnetic suspension balance. Purely gravimetric measurements. *J. Therm. Anal. Calorim.* 2003, 71, 73.

Dreisbach, F., Staudt, R., Keller, J. U. Experimental investigation of the kinetics of adsorption of pure gases and binary gas mixtures on activated carbon. In: Meunier, F. (eds.) Proceedings of Fundamental of Adsorption 6, pp. 1219-1224. Elsevier, Paris, 1998.

Goj, A., Sholl, D. S., Akten, E. D., Kohen, D. Atomistic simulations of CO$_2$ and N$_2$ adsorption in silica zeolites: the impact of size and shape. *J. Phys. Chem. B* 2002, 106, 8367.

Halmann, M. M., Stenberg, M. Greenhouse Gas Carbon Dioxide Mitigation, CRC Press LLC, Boca Raton, Fla. (1999).

Harlick, P. J. E., Sayari, A. Application of pore-expanded mesoporous silica 5: Triamine grafted material with exceptional CO$_2$ dynamic and equilibrium adsorption performance. *Ind. Eng. Chem. Res.* 2007, 46, 446.

He, Y., Seaton, N. A. Heats of adsorption and adsorption heterogeneity for methane, ethane and carbon dioxide. *Langmuir* 2006, 22, 1150.

Himeno, S., Komatsu, T., Fujita, S. High-pressure adsorption equilibria of methane and carbon dioxide on several activated carbons. *J. Chem. Eng. Data,* 2005, 50, 369.

Hong, M., Li, S., Falconer, J. L., Noble, R. D. Hydrogen purification using a SAPO-34 membrane. *J. Membr. Sci.* 2008, 307, 277.

Huang, L., Zhang, L., Shao, Q., Lu, L.; Lu, X., Jiang, S., Shen, W. Simulations of binary mixture adsorption of carbon dioxide and methane in carbon nanotubes: temperature, pressure, pore size effects. *J. Phys. Chem. C* 2007, 111, 11912.

Li, Y., Yang, R. T. Gas adsorption and storage in metal-organic framework MOF-177. *Langmuir* 2007, 23, 12937.

Llewellyn, P. L., Bourrelly, S., Serre, C., Filinchuk, Y., T., Férey, G. How hydration drastically improves adsorption selectivity for CO$_2$ over CH$_4$ in the flexible chromium terephthalate MIL-53. *Angew. Chem. Int. Ed.* 2006, 45, 7751.

Millward, A. R., Yaghi, O. M. Metal-organic frameworks with exceptionally high capacity for storage of carbon dioxide at room temperature. *J. Am. Chem. Soc.* 2005, 127, 17998.

Morishige, K., Fujii, H., Uga, M., Kinukawa, D. Capillary critical point of argon, nitrogen, oxygen, ethylene and carbon dioxide in MCM-41. *Langmuir* 1997, 13, 3494.

Morishige, K., Nakamura, Y. Nature of adsorption and desorption branches on cylindrical pores. *Langmuir* 2004, 20, 4503.

Murcia, A. B., Fletcher, A. J., Garcia-Martinez, J., Cazorla-Amoros, D., Linares-Solano, A., Thomas, K. M. Probe molecule kinetics studies of adsorption on MCM-41. *J. Phys. Chem. B* 2003, 107, 1012.

Pirngruber, G., Jolimaitre, E., Wolff, L, Leinkugel le coq, D. Hydrogen adsorption purification method with co-generation of a pressurised CO$_2$ flow. Patent number: WO 2008/081102

Ruthven, D. M., Farooq, S., Knaebal, K. S. Pressure swing adsorption. VCH, New York (1994).

Satyapal, S., Filburn, T., Trela, J., Strange, J. Performances and properties of a solid amine sorbent for carbon dioxide removal in space life support application, *Energy & Fuels* 2001, 15, 250.

Sayari, A. Catalysis by crystalline mesoporous molecular sieves, *Chem. Mater.* 1996, 8, 1840.

Sayari, A. *Mesoporous Materials*. In The Chemistry of Nanostructured Materials; Yang, P., Eds.; P 39, World Scientific: Singapore (2003).

Sayari, A., Jaroniec, M. Nanoporous Materials, World Scientific Publ. Co., Singapore (2008).

Serna-Guerrero, R., Sayari, A. Applications of pore-expanded mesoporous silica. 7. Adsorption of volatile organic compounds. *Environ. Sci. Technol.* 2007, 41, 4761.

Sircar, S.: Role of helium void measurement in estimation of gibbsian surface excess. In Proceedings of Fundamental of Adsorption 7; Kaneko, K., Ed., pp. 656-663. IK International, Chiba City (2002).

Siriwardane, R. V., Shen, M. S., Fisher, E. P., Poston J. A.: Adsorption of $CO_2$ on molecular sieves and activated carbon. *Energy & Fuels* 2001, 15, 279.

Sonwane, C. G., Bathia, S. K., Calos, N. Experimental and theoretical investigation of adsorption hysteresis and criticality in MCM-41: Studies with $O_2$, Ar, and $CO_2$. *Ind. Eng. Chem. Res.* 1998, 37, 2271.

Sridhar, S., Smitha, B., Aminabhavi, T. M. Separation of carbon dioxide from natural gas mixtures through polymeric membranes—A review. *Sep. Pur Rev.* 2007, 36, 113.

Veawab, A., Tontiwachwuthikul, P., Chakma, A. Corrosion behaviour of carbon dioxide steel in the $CO_2$ absorption process using aqueous amine solutions. *Ind. Eng. Chem. Res.* 1999, 38, 3917.

Wang, X. P., Yu, J. J., Cheng, J., Hao, Z. P., Xu, Z. P. High-temperature adsorption of carbon dioxide on mixed oxides derived hydrotalcite-like compounds. *Environ. Sci. Technol.* 2008, 42, 614.

Yang, Q., Xue, C., Zhong, C., Chen, J. F. Molecular simulation of separation of $CO_2$ from flue gas in Cu-BTC metal-organic framework. *AIChE J.* 2007, 53, 2832.

Yang, Q., Zhong, C. Molecular simulation of carbon dioxide/methane/hydrogen mixture adsorption in metal-organic frameworks. *J. Phys. Chem.* 2006, 110, 17776.

Yang, Q., Zhong, C., Chen, J. F. Computational study of $CO_2$ storage in metal-organic frameworks. *J. Phys. Chem. C.* 2008, 112, 1562.

Yun, J. H., Duren, T., Keil, F. J., Seaton, N. A. Adsorption of methane, ethane and their binary mixtures on MCM-41: Experimental evaluation of methods for the prediction of adsorption equilibrium. *Langmuir* 2002, 18, 2693.

All publications, patents and patent applications mentioned in this Specification are indicative of the level of skill of those skilled in the art to which this invention pertains and are herein incorporated by reference to the same extent as if each individual publication, patent, or patent application was specifically and individually indicated to be incorporated by reference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The embodiments of the invention in which an exclusive property or privilege is claimed are defined as follows:

1. A process for the removing $CO_2$ from a gas stream containing $CO_2$, which process comprises:
   (a) conducting said gas stream through an adsorbent containing a mesoporous material under high pressure to adsorb said $CO_2$ onto said adsorbent and produce a substantially $CO_2$-free gas stream.

2. The process of claim 1 additionally comprising:
   (b) reducing the pressure on said adsorbent having $CO_2$ adsorbed thereon to a moderate pressure to desorb at least a fraction of the adsorbed $CO_2$.

3. A process according to claim 1 wherein said adsorbent is a mesoporous silica with pore diameter in the range of 2-50 nm, having a pore volume in the range of 0.4 to 4 $cm^3$/g, and a surface area in the range of 500-2000 $m^2$/g.

4. A process according to claim 3, wherein the pore diameter is in the range of 3 to 15 nm, and the pore volume is in the range of 1 to 3 $cm^3$/g.

5. A process according to claim 1 wherein said adsorbent is a mesoporous metallosilica with pore diameter in the range of 2-50 nm, having a pore volume in the range of 0.4 to 4 $cm^3$/g, and a surface area in the range of 500-2000 $m^2$/g.

6. A process according to claim 5, wherein the pore diameter is in the range of 3 to 15 nm, and the pore volume is in the range of 1 to 3 $cm^3$/g.

7. A process according to claim 1 wherein said adsorbent is a mesoporous metal or mixed metal oxide with pore diameter in the range of 2-50 nm, having a pore volume in the range of 0.3 to 4 $cm^3$/g, and a surface area in the range of 200-2000 $m^2$/g.

8. A process according to claim 7, wherein the pore diameter is in the range of 3 to 15 nm, and the pore volume is in the range of 1 to 3 $cm^3$/g.

9. A process according to claim 1 wherein said adsorbent is a cation exchanged mesoporous metallosilica with pore diameter in the range of 2-50 nm, having a pore volume in the range of 0.4 to 4 $cm^3$/g, and a surface area in the range of 500-2000 $m^2$/g.

10. A process according to claim 9, wherein the pore diameter is in the range of 3 to 15 nm, and the pore volume is in the range of 1 to 3 $cm^3$/g.

11. A process according to claim 5 wherein said metallosilica is aluminosilica, titanosilica, borosilica or iron-silica.

12. A process according to claim 7 wherein said metal or mixed metal oxide is alumina, titania, zirconia or a combination thereof.

13. A process according to claim 1 wherein metals and/or metal oxides are added to said adsorbent.

14. A process according to claim 1 wherein said adsorbent exhibits a $CO_2$ adsorption isotherm corresponding to high adsorption capacity at high pressure (H) and low capacity at medium pressure (M), suitable for use in bulk separation applications based on PSA-H/M pressure-swing adsorption, with adsorption at pressure H (bar) and desorption at pressure M (bar).

15. A process according to claim 14 wherein said high pressure H is between about 20 and about 65 bar, and wherein said medium pressure M is between about 5 and about 25 bar.

16. A process according to claim 15, wherein said high pressure H is between about 35 and about 55 bar, and wherein said medium pressure is in between about 10 and about 20 bar.

17. A process according to claim 3 wherein said mesoporous silica exhibits a $CO_2$ adsorption capacity at room temperature in dry and humid conditions in the range of 40 wt %-120 wt % at 60 bar and PSA-60/10 capacity of 30 to 100 wt %.

18. A process according to claim 3 wherein said mesoporous silica exhibits favourable $CO_2$ selectivity over $N_2$, $CH_4$, $O_2$, $H_2$ and CO.

19. A process according to claim 3 wherein said mesoporous silica exhibits enhanced $CO_2$ selectivity over $N_2$, $CH_4$, $O_2$, $H_2$ and CO in the presence of moisture.

20. A process according to claim 3 wherein said mesoporous silica exhibits a $CO_2$ adsorption rate at room temperature in the range of $3\times10^{-2}$-$6\times10^{-2}$ $s^{-1}$.

* * * * *